United States Patent
Hsieh et al.

(10) Patent No.: US 9,313,478 B2
(45) Date of Patent: Apr. 12, 2016

(54) STEREOSCOPIC DISPLAY PANEL, DISPLAY PANEL AND DRIVING METHOD THEREOF

(71) Applicant: Au Optronics Corporation, Hsinchu (TW)

(72) Inventors: Jen-Chieh Hsieh, Changhua County (TW); Wei-Kai Huang, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 603 days.

(21) Appl. No.: 13/747,488

(22) Filed: Jan. 23, 2013

(65) Prior Publication Data

US 2014/0049619 A1    Feb. 20, 2014

(30) Foreign Application Priority Data

Aug. 17, 2012   (TW) .............................. 101129901 A

(51) Int. Cl.
| | | |
|---|---|---|
| H04N 13/04 | (2006.01) | |
| G09G 3/00 | (2006.01) | |
| G02F 1/1362 | (2006.01) | |
| G02F 1/1343 | (2006.01) | |
| G02F 1/136 | (2006.01) | |

(52) U.S. Cl.
CPC ...... *H04N 13/0402* (2013.01); *G02F 1/136286* (2013.01); *G09G 3/003* (2013.01); *H04N 13/0413* (2013.01); *G02F 1/13624* (2013.01); *G02F 1/136213* (2013.01); *G02F 2001/13606* (2013.01); *G02F 2001/134345* (2013.01); *G09G 2300/0426* (2013.01); *G09G 2310/0202* (2013.01); *G09G 2310/0262* (2013.01)

(58) Field of Classification Search
CPC .................................................. H04N 13/0402
See application file for complete search history.

(56) References Cited

U.S. PATENT DOCUMENTS

| | | | |
|---|---|---|---|
| 7,982,219 B2 | 7/2011 | Kuo et al. | |
| 8,427,596 B2 | 4/2013 | Ma | |
| 8,564,629 B2* | 10/2013 | Toyotaka et al. | 345/690 |
| 2010/0157189 A1* | 6/2010 | Ma | 349/48 |
| 2010/0219414 A1 | 9/2010 | Kim | |
| 2010/0245698 A1 | 9/2010 | Kim et al. | |
| 2011/0032457 A1 | 2/2011 | Kwak et al. | |
| 2012/0154359 A1* | 6/2012 | Shibata et al. | 345/209 |
| 2013/0215091 A1 | 8/2013 | Ma | |

FOREIGN PATENT DOCUMENTS

CN            101762915           6/2010

OTHER PUBLICATIONS

"Office Action of China Counterpart Application", issued on Aug. 5, 2014, p. 1-p. 8.

* cited by examiner

*Primary Examiner* — Jefferey Harold
*Assistant Examiner* — Justin Sanders
(74) *Attorney, Agent, or Firm* — Jianq Chyun IP Office

(57) ABSTRACT

A stereoscopic display panel, a display panel and a driving method thereof are provided. A pixel array of the pixel array substrate includes a first scan line, a second scan line, a first data line, a first pixel electrode, a second pixel electrode, a first active device and a second active device. The first data line is electrically connected to the first pixel electrode disposed at the left side of the first data line through the first active device. The first data line is electrically connected to the second pixel electrode disposed at the right side of the first data line through the second active device. The first scan line electrically connected to the first active device and the second scan line electrically connected to the second active device are disposed at the same side of the first active device and the second active device.

49 Claims, 19 Drawing Sheets

STEREOSCOPIC DISPLAY PANEL, DISPLAY PANEL AND DRIVING METHOD THEREOF

CROSS-REFERENCE TO RELATED APPLICATION

This application claims the priority benefit of Taiwan application serial no. 101129901, filed on Aug. 17, 2012. The entirety of the above-mentioned patent application is hereby incorporated by reference herein and made a part of this specification.

BACKGROUND OF THE DISCLOSURE

1. Field of the Disclosure

The disclosure relates to a stereoscopic display panel, a display panel and a driving method thereof. More particularly, the disclosure relates to a stereoscopic display panel with a half source line driving (HSD), a display panel and a driving method thereof.

2. Description of Related Art

As technologies in optoelectronics and semiconductors advance, flat panel displays also flourish accordingly. Among various flat panel displays, the liquid crystal display (LCD) has become the mainstream in the market because of its superior characteristics, such as high space utilization, low power consumption, no radiation and low electromagnetic disturbance. At present, major demands in the market for a liquid crystal display includes a high contrast ratio, a rapid response and a wide viewing angle.

In the presence of all structures of the pixel array of the current LCD panel with developments of large-sized display panels, one is named the half source driving (hereinafter "HSD") structure. Since numbers of data lines are halved when the HSD structure is adopted, amounts of source drivers are relatively reduced. More specifically, in a pixel array of the HSD structure, two adjacent sub-pixels share one data line. Therefore, numbers of data lines are halved.

Currently, the existing HSD structure has a design that disposes a scan line on different sides of two adjacent sub-pixels that share only one data line to drive the two adjacent sub-pixels, respectively, wherein scan line on the different sides of two adjacent sub-pixels means only one scan line on one side of the two adjacent sub-pixels and only one scan on other side of the two adjacent sub-pixels, therefore number of the scan lines on the different sides of two adjacent sub-pixels are two scan lines, and the scan lines and the data line are not disposed to be parallel to each other, and the scan lines and the data line usually and substantially interlace with each other vertically. Active devices of the two adjacent sub-pixels are connected to one of the scan lines disposed at the different sides. When opening directions of patterns of the active devices are parallel to the data lines, opening directions of the active devices of the two adjacent sub-pixels are opposite to each other. Accordingly, if a photomask shift occurs in a photomask fabricating process for patterns of the defined source and the drain, a variable quantity of gate/source capacitors ($C_{gs}$) in adjacent sub-pixels is different and effects has the same feed through voltages ($V_{ft}$). As a result, adjacent sub-pixels have different levels of brightness that further causes an issue of bright and dark lines on display frames and lowers the display quality for the display.

SUMMARY OF THE DISCLOSURE

The aspect provides a display panel having favorable display quality.

The aspect provides a stereoscopic display panel including the display panel and thereby has favorable display quality.

The aspect provides a driving method of a display panel that can reduce bright and dark lines to generate, such that the display panel has favorable display quality.

The aspect provides a display panel including an opposite substrate, a display medium and a pixel array substrate. The pixel array substrate includes a pixel array disposed on a substrate. The pixel array at least includes a first scan line, a second scan line, a first data line, a first pixel electrode, a second pixel electrode, a first active device and a second active device. The first data line is electrically connected to the first pixel electrode disposed at the left side of the first data line through the first active device. The first data line is also electrically connected to the second pixel electrode disposed at the right side of the first data line through the second active device. The first scan line is electrically connected to the first active device. The second scan line is electrically connected to the second active device. The first scan line and the second scan line are disposed at the same side of the first active device and the second active device.

The aspect provides a stereoscopic display panel suitable for a viewer to watch, and the stereoscopic display panel includes a switchable barrier and a display panel such as the one described above. The switchable barrier and the display panel are both disposed on an observation path of a viewer.

The aspect provides a driving method adapted to drive the display panel, wherein a drain of the second active device interlaces the first scan line. The driving method includes the following steps. In a first period within a frame period of a display panel, a first scan signal is provided to an $i^{th}$ first scan line so as to turn on a first active device connected by the $i^{th}$ first scan line. A first display data is written to a first pixel electrode connected by the $i^{th}$ first scan line via a first data line, wherein the first pixel electrode is connected by the first active device, and i is an integer greater than or equal to 1. Next, in a second period within the frame period, a second scan signal is provided to an $i^{th}$ second scan line so as to turn on a second active device connected by the $i^{th}$ second scan line. A second display data is written to a second pixel electrode connected by the second active device connected by the $i^{th}$ second scan line via the first data line. Next, in a third period within the frame period, a third scan signal is provided to an $(i+1)^{th}$ first scan line so as to turn on the first active device connected by the $(i+1)^{th}$ first scan line. A third display data is written to the first pixel electrode connected by the first active device connected by the $(i+1)^{th}$ first scan line via the first data line. Next, in a fourth period within the frame period, a fourth scan signal is provided to an $(i+1)^{th}$ second scan line so as to turn on the second active device connected by the $(i+1)^{th}$ second scan line. A fourth display data is written to the second pixel electrode connected by the second active device connected by the $(i+1)^{th}$ second scan line via the first data line.

The aspect provides a driving method adapted to drive the display panel, wherein a first scan line, a second scan line and a third scan line are disposed at the same side of a first pixel electrode, and a drain of a second active device and a drain of a fourth active device interlace the first scan line. The driving method includes the following steps. In a first period within a frame period of a display panel, a first scan signal is provided to an $i^{th}$ first scan line so as to turn on a first active device and a third active device connected by the $i^{th}$ first scan line. A first display data is written to a first pixel electrode and a third pixel electrode via the first data line, wherein the first pixel electrode is connected by the first active device connected by the $i^{th}$ first scan line and the third pixel electrode is connected by the third active device connected by the $i^{th}$ first scan line, and i is an integer greater than or equal to 1. Next, in a second period within the frame period, a second scan signal is provided to an $i^{th}$ second scan line so as to turn on a second active device and a fourth active device connected by the $i^{th}$ second scan line. A second display data is written to a second pixel electrode and a fourth pixel electrode via a first data line, wherein the second pixel electrode is connected by the second active device connected by the $i^{th}$ second scan line and the fourth pixel electrode is connected by the fourth active device connected by the $i^{th}$ second scan line. Next, in a third period within the frame period, a third scan signal is provided to an $i^{th}$ third scan line so as to turn on fifth active devices connected by the $i^{th}$ third scan line, and affect the first display data written to the third pixel electrode connected by the $i^{th}$ first scan line and the second display data written to the fourth pixel electrode connected by the $i^{th}$ second scan line. Next, in a fourth period within the frame period, a fourth scan signal is provided to an $(i+1)^{th}$ first scan line so as to turn on the first active device and the third active device connected by the $(i+1)^{th}$ first scan line. A third display data is written to the first pixel electrode and the third pixel electrode via the first data line, wherein the first pixel electrode is connected by the first active device connected by the $(i+1)^{th}$ first scan line and the third pixel electrode is connected by the third active device connected by the $(i+1)^{th}$ first scan line. Next, in a fifth period within the frame period, a fifth scan signal is provided to an $(i+1)^{th}$ second scan line so as to turn on the second active device and the fourth active device connected by the $(i+1)^{th}$ second scan line. A fourth display data is written to the second pixel electrode and the fourth pixel electrode connected by the $(i+1)^{th}$ second scan line via the first data line, wherein the second pixel electrode is connected by the second active device connected by the $(i+1)^{th}$ second scan line and the fourth pixel electrode is connected by the fourth active device connected by the $(i+1)^{th}$ second scan line. Next, in a sixth period within the frame period, a sixth scan signal is provided to an $(i+1)^{th}$ third scan line so as to turn on fifth active devices connected by the $(i+1)^{th}$ third scan line, and affect the third display data written to the third pixel electrode connected by the $(i+1)^{th}$ first scan line and the fourth display data written to the fourth pixel electrode connected by the $(i+1)^{th}$ second scan line.

The aspect provides a driving method adapted to drive the display panel, wherein a first scan line, a second scan line and a third scan line are disposed at the same side of a first pixel electrode, and a drain of a first active device and a drain of a third active device interlace the second scan line. The driving method includes the following steps. In a first period within a frame period of a display panel, a first scan signal is provided to an $i^{th}$ second scan line so as to turn on a second active device and a fourth active device connected by the $i^{th}$ second scan line. A first display data is written to a second pixel electrode and a fourth pixel electrode via a first data line, wherein the second pixel electrode is connected by the second active device connected by the $i^{th}$ second scan line and the fourth pixel electrode is connected by the fourth active device connected by the $i^{th}$ second scan line, and i is an integer greater than or equal to 1. Next, in a second period within the frame period, a second scan signal is provided to an $i^{th}$ first scan line so as to turn on a first active device and a third active device connected by the $i^{th}$ first scan line. A second display data is written to a first pixel electrode and a third pixel electrode via the first data line, wherein the first pixel electrode is connected by the first active device connected by the $i^{th}$ first scan line and the third pixel electrode is connected by the third active device connected by the $i^{th}$ first scan line. Next, in a third period within the frame period, a third scan signal is provided to an $i^{th}$ third scan line so as to turn on fifth active devices connected by the $i^{th}$ third scan line, and affect the second display data written to the third pixel electrode connected by the $i^{th}$ first scan line and the first display data written to the fourth pixel electrode connected by the $i^{th}$ second scan line. Next, in a fourth period within the frame period, a fourth scan signal is provided to an $(i+1)^{th}$ second scan line so as to turn on the second active device and the fourth active device connected by the $(i+1)^{th}$ second scan line. A third display data is written to the second pixel electrode and the fourth pixel electrode via the first data line, wherein the second pixel electrode is connected by the second active device connected by the $(i+1)^{th}$ second scan line and the fourth pixel electrode is connected by the fourth active device connected by the $(i+1)^{th}$ second scan line. In a fifth period within the frame period, a fifth scan signal is provided to an $(i+1)^{th}$ first scan line so as to turn on the first active device and the third active device connected by the $(i+1)^{th}$ first scan line. A fourth display data is written to the first pixel electrode and the third pixel electrode via the first data line, wherein the first pixel electrode is connected by the first active device connected by the $(i+1)^{th}$ first scan line and the third pixel electrode is connected by the third active device connected by the $(i+1)^{th}$ first scan line. Next, in a sixth period within the frame period, a sixth scan signal is provided to an $(i+1)^{th}$ third scan line so as to turn on fifth active devices connected by the $(i+1)^{th}$ third scan line, and affect the fourth display data written to the third pixel electrode connected by the $(i+1)^{th}$ first scan line and the third display data written to the fourth pixel electrode connected by the $(i+1)^{th}$ second scan line.

The aspect provides a driving method adapted to drive the display panel, wherein a first active device is disposed at the different side of a first scan line and a third scan line, and a drain of the first active device and a drain of a third active device interlace a second scan line. The driving method includes the following steps. In a first period within a frame period of a display panel, a first scan signal is provided to an $i^{th}$ second scan line so as to turn on a second active device and a fourth active device connected by the $i^{th}$ second scan line. A first display data is written to a second pixel electrode and a fourth pixel electrode via the first data line, wherein the second pixel electrode is connected by the second active device connected by the $i^{th}$ second scan line and the fourth pixel electrode is connected by the fourth active device connected by the $i^{th}$ second scan line, and i is an integer greater than or equal to 1. Next, in a second period within the frame period, a second scan signal is provided to an $i^{th}$ first scan line so as to turn on a first active device and a third active device connected by the $i^{th}$ first scan line. A second display data is written to a first pixel electrode and a third pixel electrode via the first data line, wherein the first pixel electrode is connected by the first active device connected by the $i^{th}$ first scan line and the third pixel electrode is connected by the third active device connected by the $i^{th}$ first scan line. In a third period within the frame period, a third scan signal is provided to an $i^{th}$ third scan line so as to turn on fifth active devices connected by the $i^{th}$ third scan line, and affect the second display data written to the third pixel electrode connected by the $i^{th}$ first scan line and the first display data written to the fourth pixel electrode connected by the $i^{th}$ second scan line. Next, in a fourth period within the frame period, a fourth scan signal is provided to an $(i+1)^{th}$ second scan line so as to turn on the second active device and the fourth active device connected by the $(i+1)^{th}$ second scan line. A third display data is written to the second pixel electrode and the fourth pixel electrode via the first data line, wherein the second pixel electrode is connected by the second active device connected by the $(i+1)^{th}$ second scan line and the fourth pixel electrode is connected by the fourth active device connected by the $(i+1)^{th}$ second scan line. Next, in a fifth period within the frame period, a fifth scan signal is provided to an $(i+1)^{th}$ first scan line so as to turn on the first active device and the third active device connected by the $(i+1)^{th}$ first scan line. A fourth display data is written to a first pixel electrode and the third pixel electrode via the first data line, wherein the first pixel electrode is connected by the first active device connected by the $(i+1)^{th}$ first scan line and the third pixel electrode is connected by the third active device connected by the $(i+1)^{th}$ first scan line. Next, in a sixth period within the frame period, a sixth scan signal is provided to an $(i+1)^{th}$ third scan line so as to turn on fifth active devices connected by the $(i+1)^{th}$ third scan line, and affect the fourth display data written to the third pixel electrode connected by the $(i+1)^{th}$ first scan line and the third display data written to the fourth pixel electrode connected by the $(i+1)^{th}$ second scan line.

The aspect provides a driving method adapted to drive the display panel, wherein a first active device is disposed at the different side of a first scan line and a third scan line, and a drain of a second active device and a drain of a fourth active device interlace the first scan line, and the driving method includes the following steps. In a first period within a frame period of a display panel, a first scan signal is provided to an $i^{th}$ first scan line so as to turn on a first active device and a third active device connected by the $i^{th}$ first scan line. A first display data is written to a first pixel electrode and a third pixel electrode via a first data line, wherein the first pixel electrode is connected by the first active device connected by the $i^{th}$ first scan line and the third pixel electrode is connected by the third active device connected by the $i^{th}$ first scan line, and i is an integer greater than or equal to 1. Next, in a second period within the frame period, a second scan signal is provided to an $i^{th}$ second scan line so as to turn on a second active device and a fourth active device connected by an $i^{th}$ second scan line. A second display data is written to a second pixel electrode and a fourth pixel electrode via the first data line, wherein the second pixel electrode is connected by the second active device connected by the $i^{th}$ second scan line and the fourth pixel electrode is connected by the fourth active device connected by the $i^{th}$ second scan line. Next, in a third period within the frame period, a third scan signal is provided to an $i^{th}$ third scan line so as to turn on fifth active devices connected by the $i^{th}$ third scan line, and affect the first display data written to the third pixel electrode connected by the $i^{th}$ first scan line and the second display data written to the fourth pixel electrode connected by the $i^{th}$ second scan line. Next, in a fourth period within the frame period, a fourth scan signal is provided to an $(i+1)^{th}$ first scan line so as to turn on the first active device and the third active device connected by the $(i+1)^{th}$ first scan line. A third display data is written to the first pixel electrode and the third pixel electrode via the first data line, wherein the first pixel electrode is connected by the first active device connected by the $(i+1)^{th}$ first scan line and the third pixel electrode is connected by the third active device connected by the $(i+1)^{th}$ first scan line. Next, in a fifth period within the frame period, a fifth scan signal is provided to an $(i+1)^{th}$ second scan line so as to turn on the second active device and the fourth active device connected by the $(i+1)^{th}$ second scan line. A fourth display data is written to the second pixel electrode and the fourth pixel electrode via the first data line, wherein the second pixel electrode is connected by the second active device connected by the $(i+1)^{th}$ second scan line and the fourth pixel electrode is connected by the fourth active device connected by the $(i+1)^{th}$ second scan line. Next, in a sixth period within the frame period, a sixth scan signal is provided to an $(i+1)^{th}$ third scan line so as to turn on fifth active devices connected by the $(i+1)^{th}$ third scan line, and affect the third display data written to the third pixel electrode connected by the $(i+1)^{th}$ first scan line and the fourth display data written to the fourth pixel electrode connected by the $(i+1)^{th}$ second scan line.

In light of the foregoing, in the display panel of the disclosure, the first scan line and the second scan line are disposed at the same side of the first active device and the second active device, such that the first active device and the second active device has the same feed through voltage. Accordingly, adjacent sub-pixels has same brightness and the display panel has favorable display quality.

In order to make the aforementioned features and advantages of the disclosure more comprehensible, embodiments accompanied with figures are described in details below.

DESCRIPTION OF EMBODIMENTS

Figure 1:
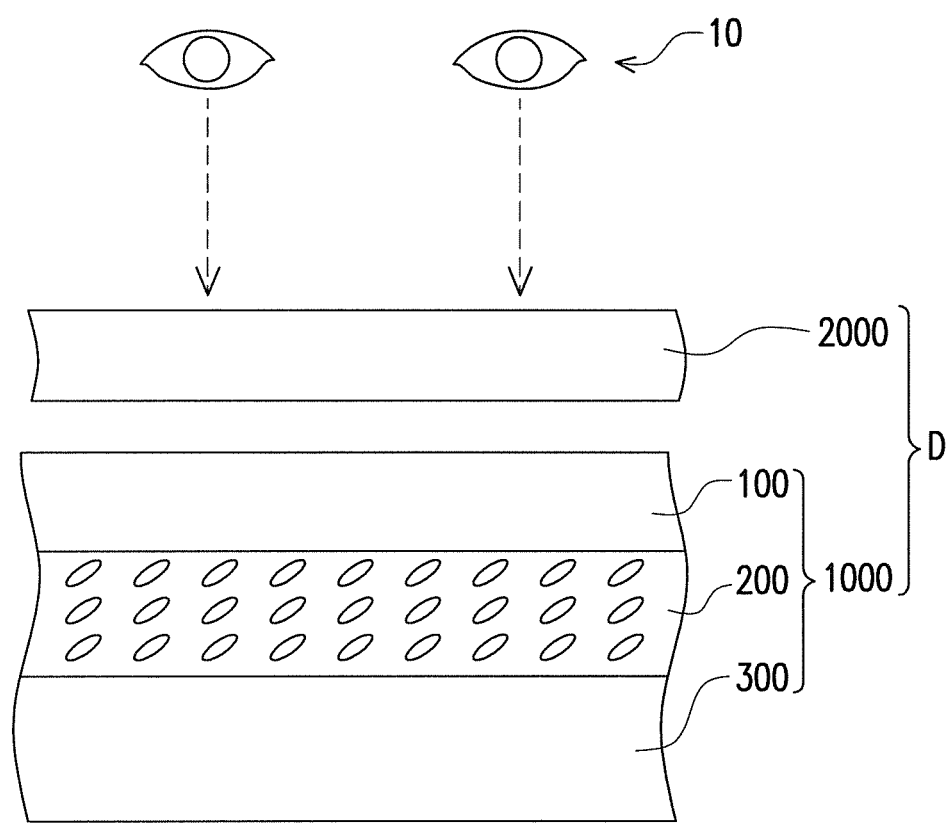
FIG. 1 is a partial cross-sectional schematic view of a stereoscopic display panel according to one embodiment.

FIG. 1 is a partial cross-sectional schematic view of a stereoscopic display panel according to one embodiment.

Referring to FIG. 1. A stereoscopic display panel D of the present embodiment is suitable for a viewer to watch. The stereoscopic display panel D includes a display panel 1000 and a switchable barrier 2000, wherein the display panel 1000 and the switchable barrier 2000 are both disposed on an observation path of a viewer 10. Embodiments of the invention preferably can dispose the switchable barrier 2000 on the display panel 1000, that is, the switchable barrier 2000 is disposed between the display panel 1000 and the viewer, but the invention is not limited thereto. In other embodiments, the switchable barrier 2000 is disposed under the display panel 1000, that is, the display panel 1000 is disposed between the switchable barrier 2000 and the viewer, wherein the switchable barrier 2000 includes an active barrier, a passive barrier, other suitable barriers or a combination of the aforementioned. The active barrier at least includes a non self-emissive layer, such as a liquid crystal layer, sandwiched between two transparent substrates. The liquid crystal layer covers a plurality of pixel regions on various lines/rows of pixel arrays of a display panel by using an electric field to control rotations of liquid crystal molecules of the liquid crystal layer in the active barrier, such that stereoscopic display images are formed in a brain of a viewer after left and right eyes of the viewer receive various signals. The passive barrier at least includes a mask layer (or namely light shielding layer) to cover a plurality of pixel regions on various lines/rows of pixel arrays of a display panel, such that stereoscopic display images are formed in a brain of a viewer after left and right eyes of the viewer receive various signals, wherein a designed embodiment of a pixel region is described as below and a plurality of pixel regions constitute a pixel array.

In the present embodiment, the display panel 1000 includes an opposite substrate 100, a display medium 200, and a pixel array substrate 300. The display medium 200 is disposed between the opposite substrate 100 and the pixel array substrate 300. The pixel array substrate 300 includes a pixel array 310a (marked in FIG. 3) disposed on a substrate 301 (marked in FIG. 2), wherein two regions are briefly used to represent the pixel array 310a in a plurality of embodiments below. In addition, several embodiments are described below to illustrate a structure of the pixel array 310a and a driving method thereof.

Figure 2:
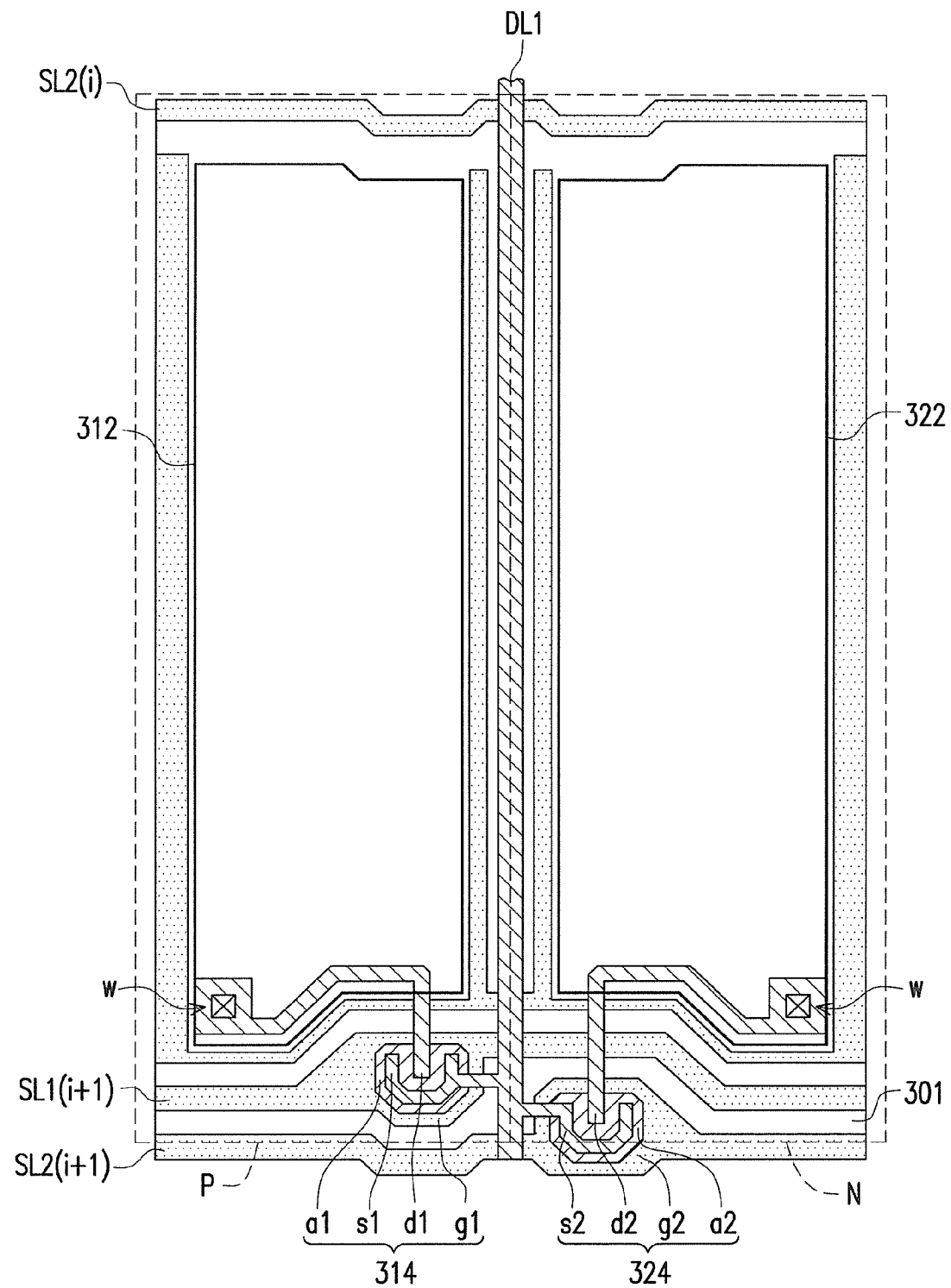
FIG. 2 is a partial top view of a pixel array according to the first embodiment.
Figure 3:
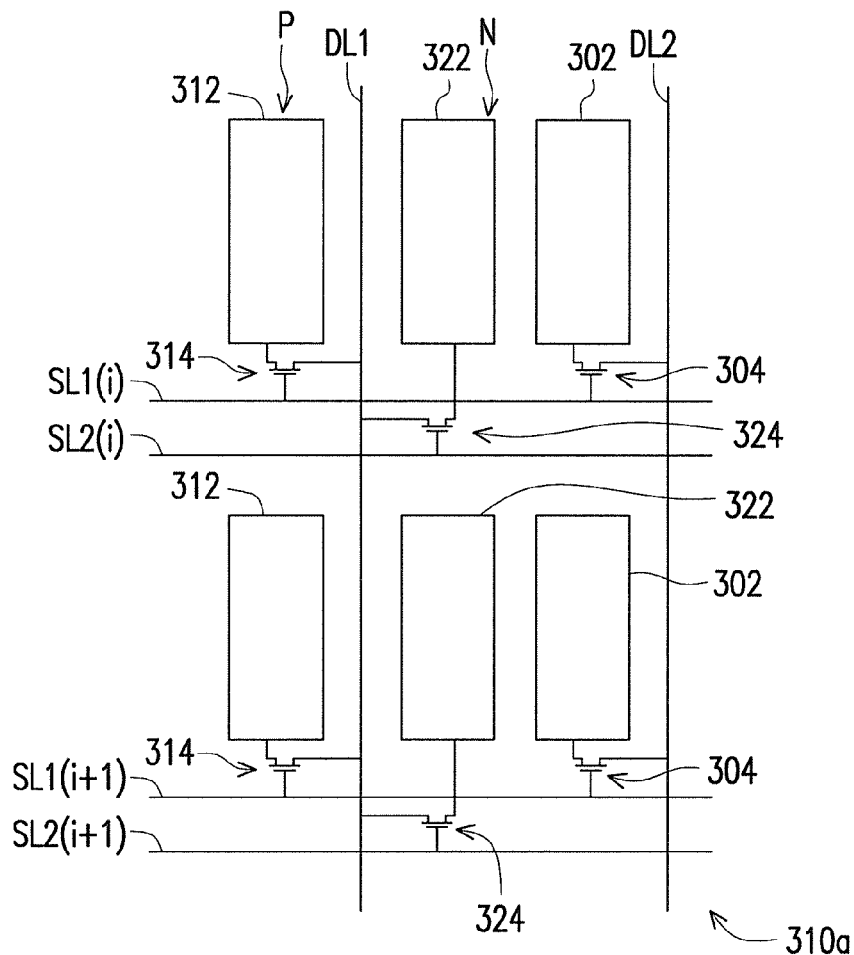
FIG. 3 is an equivalent circuit diagram of the pixel array of FIG. 2.

FIG. 2 is a partial top view of a pixel array according to the first embodiment. FIG. 3 is an equivalent circuit diagram of the pixel array of FIG. 2. Referring to FIG. 2 and FIG. 3 together. The pixel array 310a at least includes a first scan line SL1, a second scan line SL2, a first data line DL1, a first pixel electrode 312, a second electrode 322, a first active device 314 and a second active device 324. In the present embodiment, the first data line DL1, for example, is electrically connected to the first pixel electrode 312 disposed at the left side of the first data line DL1 through the first active device 314, and the first data line DL1, for example, is electrically connected to the second pixel electrode 322 disposed at the right side of the first data line DL1 through the second active device 324. Wherein the first pixel electrode 312 is separated from the second pixel electrode 322, and the first pixel electrode 312 is not contacted with the second pixel electrode 322.

In addition, the first scan line SL1 is electrically connected to the first active device 314 and the second scan line SL2 is electrically connected to the second active device 324. The first scan line SL1 and the second scan line SL2 are both disposed at the same side of the first active device 314 and the second active device 324. For example, the first scan line SL1 is disposed underside (or namely downside) of the first active device 314, and, in the meantime, the second scan line SL2 is disposed underside of the second active device 324. In other words, the first scan line SL1 is positioned right next to (or is close adjacent to or most adjacent to) the second scan line SL2, but the first scan line SL1 and the second scan line SL2 are not connected to each other. Certainly, the invention is not limited thereto. In other embodiment, the first scan line SL1 and the second scan line SL2 both can also be disposed upside of the first active device 314 and upside of the second active device 324, or at other proper positions. In other words, if a region positioning the first pixel electrode 312 is considered a first sub-pixel region and a region positioning the second pixel electrode 322 is considered a second sub-pixel region, the first scan line SL1 and the second scan line SL2 are close adjacent to each other and the first scan line SL1, for example, between the first scan line SL1 and the second scan line SL2 is not exist any scan line, and the second scan line SL2 are both disposed at the same side of the first sub-pixel region and the second sub-pixel region. In other words, the first scan line SL1 and the second scan line SL2 are most adjacent to each other and the first scan line SL1 and the second scan line SL2 are both disposed at the same side of the first pixel electrode 312 and the second pixel electrode 322.

In addition, the pixel array 310a, for example, further includes a second data line DL2, a third pixel electrode 302 and a third active device 304. The second data line DL2, for example, is electrically connected to the third pixel electrode 302 disposed at the left side of the second data line DL2 through the third active device 304. The first scan line SL1 is electrically connected to the third active device 304, and the first scan line SL1 and the second scan line SL2 are both disposed at the same side of the first active device 314 and the third active device 304. For example, the first scan line SL1 is disposed underside (or namely downside) of the first active device 314, and, in the meantime, the second scan line SL2 is disposed underside (or namely downside) of the third active device 304. In other words, if a region positioning the first pixel electrode 312 is considered a first sub-pixel region, a region positioning the second pixel electrode 322 is considered a second sub-pixel region, and the first sub-pixel region and the second sub-pixel region both (as a group) at least have a first side and an opposite second side, then the first scan line SL1 and the second scan line SL2 are close adjacent to (or namely most adjacent to) each other and the first scan line SL1 and the second scan line SL2 are both disposed at the same side, for example, the first side, of the first sub-pixel region and the second sub-pixel region. Namely, the first scan line SL1 and the second scan line SL2 are close adjacent to each other and the first scan line SL1 and the second scan line SL2 are both disposed at the same side, for example, the first side, of the first pixel electrode 312 and the second pixel electrode 322. Certainly, the invention is not limited thereto. In other embodiments, the first scan line SL1 and the second scan line SL2 can also be disposed upside of the first active device 314 and the third active device 304 or at other proper positions. In other words, the first scan line SL1 and the second scan line SL2 are close adjacent to each other and the first scan line SL1 and the second scan line SL2 are both disposed at the same side, for example, the second side and the second side opposite to the first side, of the first sub-pixel region and the second sub-pixel region. Namely, the first scan line SL1 and the second scan line SL2 are close adjacent to each other and the first scan line SL1 and the second scan line SL2 are both disposed at the same side, for example, the second side, of the first pixel electrode 312 and the second pixel electrode 322. Moreover, as shown in FIG. 3, a region positioning the third pixel electrode 302 is considered a third sub-pixel region, and the second sub-pixel region and the third sub-pixel region preferably constitute a sub-pixel region together. Namely, the second pixel electrode 322 and the third pixel electrode 302 are disposed in a region partitioned by the first data line DL1 and the adjacent second data line DL2, that is, no other data line exists between the first data line DL 1 and the adjacent second data line DL2.

In the present embodiment, the first active device 314 and the second active device 324 are, for example, thin film transistors (TFTs). The first active device 314 includes a first source s1, a first drain d1, a first gate g1 and a first active layer a1. The second active device 324 includes a second source s2, a second drain d2, a second gate g2 and a second active layer a2. In the present embodiment, since the first scan line SL1 and the second scan line SL2 are both disposed underside the first active device 314 and the second active device 324, patterns and opening directions of the first active device 314 and the second active device 324 are the same, such as opening directions of the first source s1 of the first active device 314 and the second source s2 of the second active device 324. In other words, if a region positioning the first pixel electrode 312 is considered a first sub-pixel region, a region positioning the second pixel electrode 322 is considered a second sub-pixel region, and the first sub-pixel region and the second sub-pixel region both at least have a first side and an opposite second side, then the first scan line SL1 and the second scan line SL2 are close adjacent to each other and the first scan line SL1 and the second scan line SL2 are both disposed at the same side, for example, the first side, of the first sub-pixel region and the second sub-pixel region. Namely, the first scan line SL1 and the second scan line SL2 are adjacent to each other and the first scan line SL1 and the second scan line SL2 are both disposed at the same side, for example, the first side, of the first pixel electrode 312 and the second pixel electrode 322. Specifically, an overlapping region between the first source s1 and the first gate g1, and an overlapping region of the first drain d1 and the first gate g1 are substantially equal to an overlapping region of the second source s2 and the second gate g2, and an overlapping region of the second drain d2 and the second gate g2.

In the present embodiment, the first drain d1 crosses over the first gate g1 and extends into a region of the first pixel electrode 312, and is electrically connected to the first pixel electrode 312 through a contact via w. Moreover, the second drain d2 crosses over the second gate g2 and the first scan line SL1, and extends into a region of the second pixel electrode 322, and is electrically connected to the second pixel electrode 322 through a contact via w. In other words, the first drain d1 crosses over one side of the first gate g1 and the second drain d2 crosses over one side of the second gate g2, and the first drain d1 extends into a region of the first pixel electrode 312 and the second drain d2 extends into a region of the second pixel electrode 322, wherein a side of the first gate g1 where the first drain d1 crosses over and a side of the second gate g2 where the second drain d2 crosses over are the same side.

From another aspect, the first pixel electrode 312 and the first active device 314, for example, constitute a first pixel P, and the second pixel electrode 322 and the second active device 324, for example, constitute a second pixel N. In the present embodiment, the first pixel P is driven by the first scan line SL1, the second pixel N is driven by the second scan line SL2, and the first pixel P and the second pixel N use the first data line DL1 together so as to form a half source line driving (HSD) structure. In the present embodiment, since the first scan line SL1 and the second scan line SL2 are both disposed at the same side of the first pixel P and the second pixel N, the first active device 314 and the second active device 324 have the same opening direction. In other words, the first scan line SL1 and the second scan line SL2 are close adjacent to each other and the first scan line SL1 and the second scan line SL2 are both disposed at the same side of the first pixel P and the second pixel N. As described above, when a photomask shift occurs for the pixel array 310a of the present embodiment in a photomask process for defining source and drain, a variable quantity of gate/source capacitors of the first pixel P and the second pixel N will be identical because patterns and opening directions of the first active device 314 and the second active device 324 are the same, and therefore, feed through voltages of the first pixel P and the second pixel N can be the same. As a result, the first pixel P and the second pixel N can maintain ideal values respectively so as to reduce bright and dark lines from happening and further maintain favorable display quality for the display panel 1000.

The pixel array 310a of the present embodiment can be driven by selectively adopting a polarity reversal method. For example, when the first pixel P is driven by a positive polarity signal, the second pixel N is driven by a negative polarity signal. When the first pixel P is driven by a negative polarity signal, the second pixel N is driven by a positive polarity signal. A positive polarity is defined when a voltage of a pixel electrode is substantially higher than a voltage of a common electrode, and a negative polarity is defined when a voltage of a pixel electrode is substantially lower than a voltage of a common electrode.

Referring to FIG. 1 again. In the present embodiment, the display medium 200 of the display panel 1000 includes a non self-emissive material, a self-emissive material, other suitable materials, or a combination of the aforementioned materials. The non self-emission material includes a liquid crystal material, an electro-wetting material, an electro-phoretic material, an electro-dust material, other suitable materials, or a combination of the aforementioned materials. A preferable embodiment is taking a liquid crystal material as one embodiment. Therefore, the display panel 1000 of the present embodiment substantially is a liquid crystal display panel, wherein a positive liquid crystal or a negative liquid crystal of a liquid crystal material can be used. The self-emission material includes an organic luminescence material, an inorganic luminescence material, a quantum dots luminescence material, other suitable materials, or a combination of the aforementioned materials. In addition, the opposite substrate 100 can be a color filter substrate. The color filter substrate can include a color filter film in various colors. A red light, a green light, a blue light are displayed respectively after lights pass through a red, green and blue filter films in the color filter substrate, such that effects of a colored image is achieved for the display panel 1000. Nevertheless, the present invention is not limited thereto. In other embodiments, a color filter film can also be disposed on the pixel array substrate 300 (color filter on array, COA). Pixel arrays on the pixel array substrate 300 can also be disposed on a color filter film (array on color filter, AOC). A black matrix can also be disposed on the pixel array substrate 300 (black matrix on array, BOA). Pixel arrays on the pixel array substrate 300 can also be disposed on a black matrix (array on black matrix, AOB).

Figure 4:
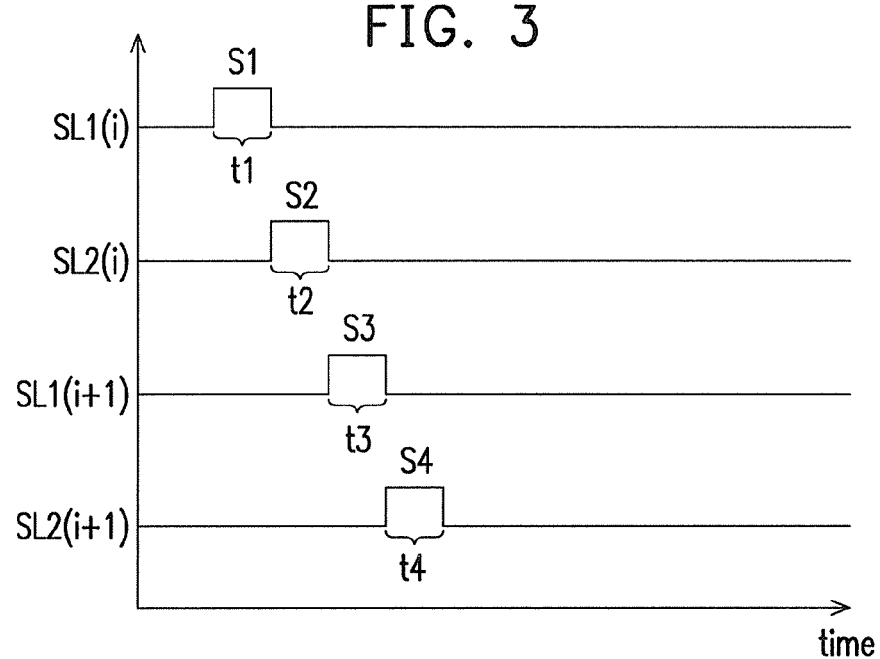
FIG. 4 is a timing waveform diagram of an equivalent circuit diagram of the pixel array of FIG. 3.

Dispositions of each device and functions thereof in the display panel 1000 of the present embodiment are introduced above. A driving method for driving the display panel 1000 will be described hereinafter. FIG. 4 is a timing waveform diagram of an equivalent circuit diagram of the pixel array of FIG. 3. Referring to FIG. 3 and FIG. 4 together. The driving method includes the following steps. First, in a first period t1 within a frame period of the display panel 1000, a first scan signal S1 is provided to an $i^{th}$ first scan line SL1 so as to turn on the first active device 314 connected by the $i^{th}$ first scan line SL1. The frame period substantially indicates a period, in which all of scan lines of the display panel 1000 sequentially turned on once. In the first period t1, a first display data is written to the first pixel electrode 312 connected by the first active device 314 connected by the $i^{th}$ first scan line SL1 via the first data line DL1, wherein i is an integer greater than or equal to 1.

Next, in a second period t2 within the frame period, a second scan signal S2 is provided to an $i^{th}$ second scan line SL2 so as to turn on the second active device 324 connected by the $i^{th}$ second scan line SL2. In the second period t2, a second display data is written to the second pixel electrode 322 connected by the second active device 324 connected by the $i^{th}$ second scan line SL2 via the first data line DL1. In addition, corresponding to an equivalent circuit diagram shown in FIG. 3, a region to which the signal is written is located at the first pixel electrode 312 and the second pixel electrode 322 on a first row.

Shortly afterwards, in a third period t3 within the frame period, a third scan signal S3 is provided to an $(i+1)^{th}$ first scan line SL1 so as to turn on the first active device 314 connected by the $(i+1)^{th}$ first scan line SL1. In the third period t3, a third display data is written to the first pixel electrode 312 connected by the first active device 314 connected by the $(i+1)^{th}$ first scan line SL1 via the first data line DL1.

Next, in a fourth period t4 within the frame period, a fourth scan signal S4 is provided to an $(i+1)^{th}$ second scan line SL2 so as to turn on the second active device 324 connected by the $(i+1)^{th}$ second scan line SL2. In the fourth period t4, a fourth display data is written to the second pixel electrode 322 connected by the second active device 324 connected by the $(i+1)^{th}$ second scan line SL2 via the first data line DL1. In addition, corresponding to an equivalent circuit diagram shown in FIG. 3, a region where the signal is written is located at the first pixel electrode 312 and the second pixel electrode 322 of a second row, wherein, the first row is sequentially adjacent to (or sequentially close adjacent to) the second row.

In the present embodiment, the second drain d2 of the second active device 324 interlaces the first scan line SL1 (as illustrated in FIG. 2). In addition, in the driving method of the present embodiment, first is to enable the first scan line SL1 so as to turn on the first pixel P, and then enable the second scan line SL2 so as to turn on the second pixel N. In other words, the driving method of the display panel 1000 of the present embodiment is to turn on the first scan line SL1 closer to a pixel in the same column (or namely first column, as illustrated in FIG. 3), and then turn on the second scan line SL2 farther from the pixel in the same column (or namely first column, as illustrated in FIG. 3). In addition, after the second scan line SL2 is turned on so as to write the second display data to the second pixel N, the second scan line SL2 is then turned off. When that happens, since the first scan line SL1 is in a turned-off state and does not have voltage variation, a capacitor coupling effect is not formed in an intersection of the second drain d2 and the first scan line SL1 to effect a data of the second pixel N. Accordingly, a feed-through voltage of the second pixel N is stabilized. In view of the foregoing, since a feed-through voltage of the first pixel P and the second pixel N may further maintain the same and brightness of the first pixel P and the second pixel N may respectively maintain ideal values so as to reduce bright and dark lines from happening, and thus to further maintain favorable display quality for the display panel 1000.

Figure 5:
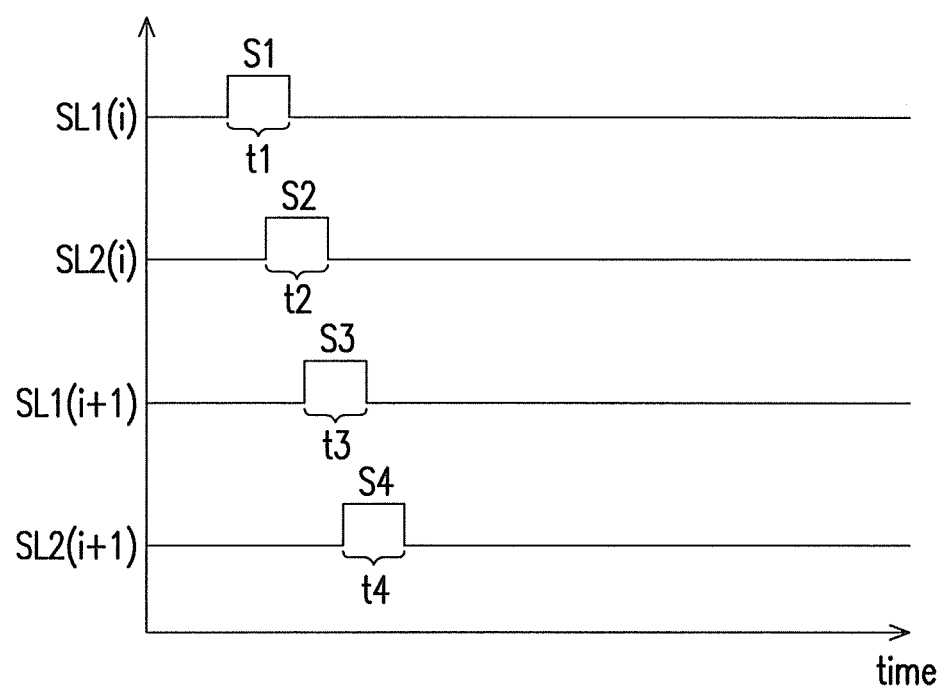
FIG. 5 is a timing waveform diagram illustrating an equivalent circuit diagram of the pixel array of FIG. 3.

In addition, in the driving method, the second period t2 is initiated right after the first period t1, and the fourth period t4 is initiated right after the third period t3. However, the invention is not limited thereto. In other embodiments, the second period t2 may also overlap partially with the first period t1, and the fourth period t4 may also overlap partially with the third period t3, as shown in FIG. 5. For example, when the second period t2 overlaps partially with the first period t1, which indicates that the second scan signal S2 is provided so as to turn on the $i^{th}$ second scan line SL2 before the $i^{th}$ first scan line SL1 is turned off. As a result, a pre-charge function may be provided so as to pre-charge the second pixel electrode 322 connected by the second active device 324 connected by the $i^{th}$ second scan line SL2, shorten a frame period, and increase a reaction speed for the liquid crystal display panel 1000.

In addition, a color washout issue generally exists in contemporary liquid crystal display panels. The so-called color washout indicates that viewers see images of different color gray scales when viewing the images displayed on a liquid crystal display from different viewing angles. For example, if viewers see images displayed on a liquid crystal display from a more slanting angle (i.e. approximately at about 60 degrees), a color gray scale of images that viewers watch is lighter than a color gray scale of images when viewers watch from a normal angle (i.e. approximately at about 90 degrees).

In order to solve a color washout issue on a liquid crystal display panel due to wider viewing angles, each of pixels in a liquid crystal display panel may be further divided into a main-pixel and a sub-pixel that can be independently driven, and pixel electrodes of the main-pixel and the sub-pixel are driven by the same scan line, but the sub-pixel may effect a pixel voltage of the sub-pixel through another scan line (an extra scan line) again and thereby may provide different pixel voltages to the main-pixel and the sub-pixel. Such technique is called a charge sharing structure. In the charge sharing structure, a main-pixel and a sub-pixel may display slightly different gray scales respectively, so as to further increase viewing angles of a display panel.

Figure 6:
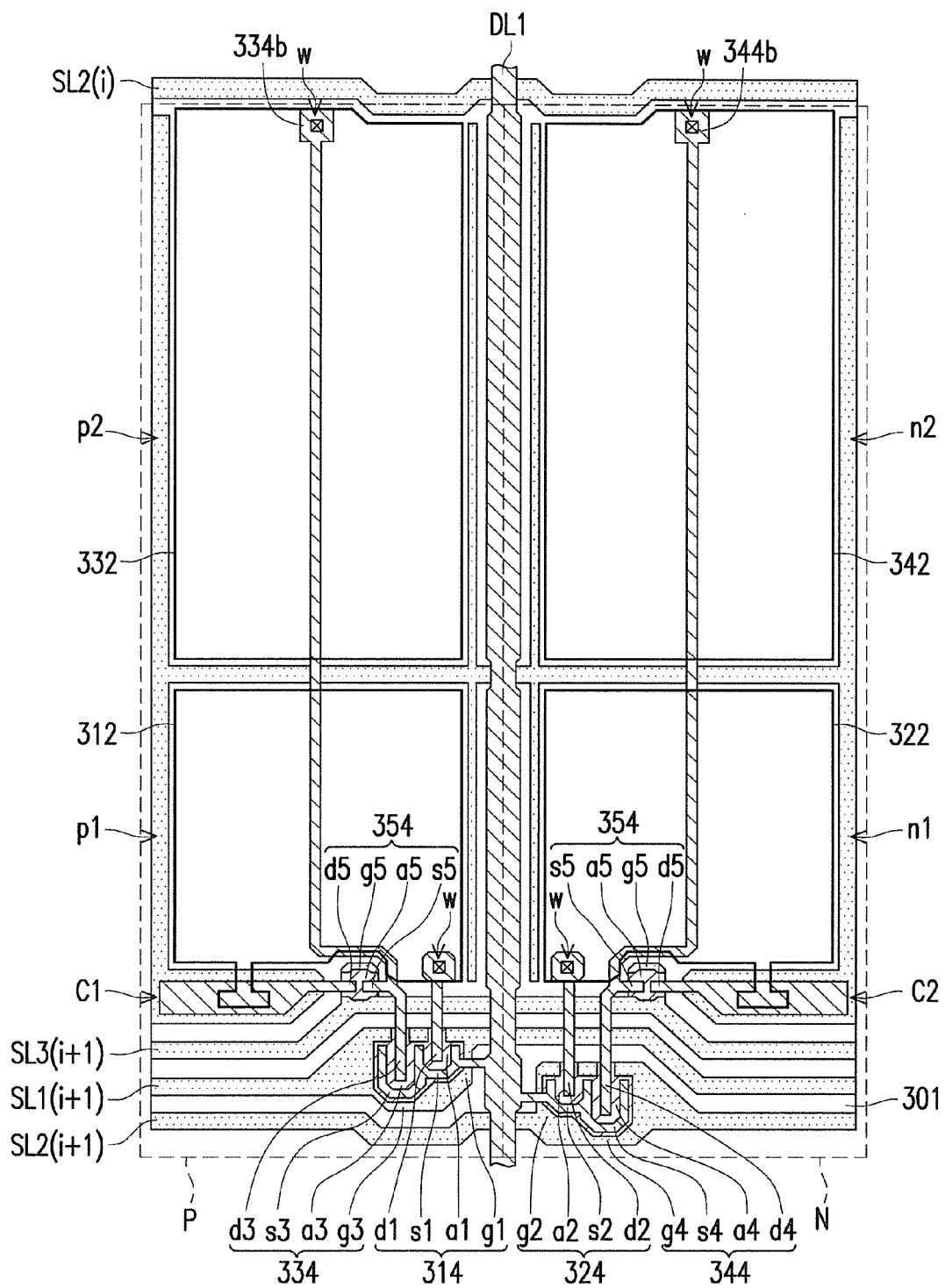
FIG. 6 is a partial top view of a pixel array according to the second embodiment.
Figure 7:
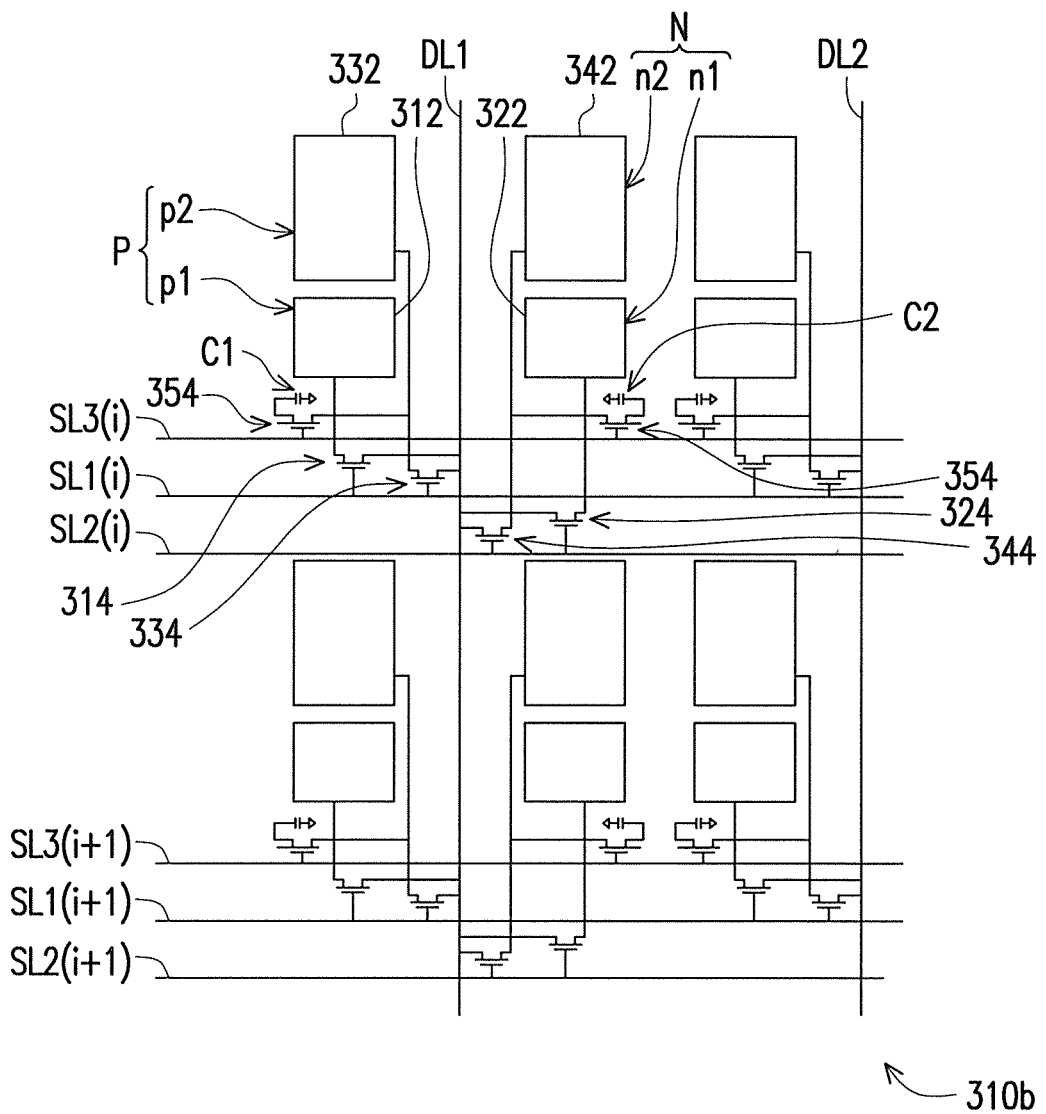
FIG. 7 is an equivalent circuit diagram of the pixel array of FIG. 6.

FIG. 6 is a partial top view of a pixel array according to the second embodiment. FIG. 7 is an equivalent circuit diagram of the pixel array of FIG. 6. Referring to FIG. 6 and FIG. 7 together. It should be noted that the pixel array 310b of the second embodiment and the pixel array 310a of the first embodiment have similar structures, and thereby the same reference numbers are used to represent the same components.

In the present embodiment, the pixel array 310b (marked in FIG. 7) at least further includes a third scan line SL3, a third pixel electrode 332, a fourth pixel electrode 342, a third active device 334, a fourth active device 344 and a plurality of fifth active devices 354. The third scan line SL3, the first scan line SL1 and the second scan line SL2 all are disposed at the same side of the first pixel electrode 312. The second drain d2 of the second active device 324 and a fourth drain d4 of the fourth active device 344 both interlace the first scan line SL1.

In the present embodiment, the first data line DL1, for example, is electrically connected to the third pixel electrode 332 disposed at the left side of the first data line DL1 through the third active device 334, and the first data line DL1, for example, is electrically connected to the fourth pixel electrode 342 disposed at the right side of the first data line DL1 through the fourth active device 344.

In addition, the third scan line SL3, for example, is electrically connected to the third pixel electrode 332 through one of the fifth active devices 354, and the third scan line SL3, for example, is electrically connected to the fourth pixel electrode 342 through another one of fifth active devices 354. In other words, one of the fifth active devices 354 may connect to the third pixel electrode 332 and a drain d3 of the third active device 334, respectively, and another one of the fifth active devices 354 may connect to the fourth pixel electrode 342 and the drain d4 of the fourth active device 344. Specifically, a source s5 of one of the fifth active devices 354 may both connect to the third pixel electrode 332 and the drain d3 of the third active device 334, and the source s5 of another one of the fifth active devices 354 may both connect to the fourth pixel electrode 342 and the drain d4 of the fourth active device 344. The third pixel electrode 332 and the fourth pixel electrode 342 are both disposed at the same side of the third scan line SL3. In other words, the first scan line SL1, the second scan line SL2 and the third scan line SL3 are close adjacent to each other and both disposed at the same side of the first pixel electrode 312, the second pixel electrode 322, the third pixel electrode 332 and the fourth pixel electrode 342. The first scan line SL1 is electrically connected to the third active device 334 and the second scan line SL2 is electrically connected to the fourth active device 344, and the first scan line SL1 and the second scan line SL2 are both disposed at the same side of the first active device 314, the third active device 334 and the fifth active device 354. For example, the first scan line SL1 of the present embodiment is disposed underside (or namely downside) of the first active device 314 and the fifth active device 354, and the second scan line SL2 is disposed underside (or namely downside) of the third active device 334 and the fifth active device 354. In another embodiment, the first scan line SL1 is disposed upside of the first active device 314 and the fifth active device 354, and the second scan line SL2 is disposed upside of the third active device 334 and the fifth active device 354.

In the present embodiment, the second drain d2 of the second active device 324 and the fourth drain d4 of the fourth active device 344 both interlace the first scan line SL1. In addition, the third drain d3 of the third active device 334, for example, crosses over one side of the first scan line SL1, the third scan line SL3 and the first pixel electrode 312, and extends to a region of the third pixel electrode 332, and is electrically connected to the third pixel electrode 332 through a contact via w. By the same token, the fourth drain d4 of the fourth active device 344, for example, crosses over one side of the first scan line SL1, the third scan line SL3 and the second pixel electrode 322, and extends to a region of the fourth pixel electrode 342, and is electrically connected to the fourth pixel electrode 342 through a contact via w. However, the invention is not limited thereto.

Figure 8:
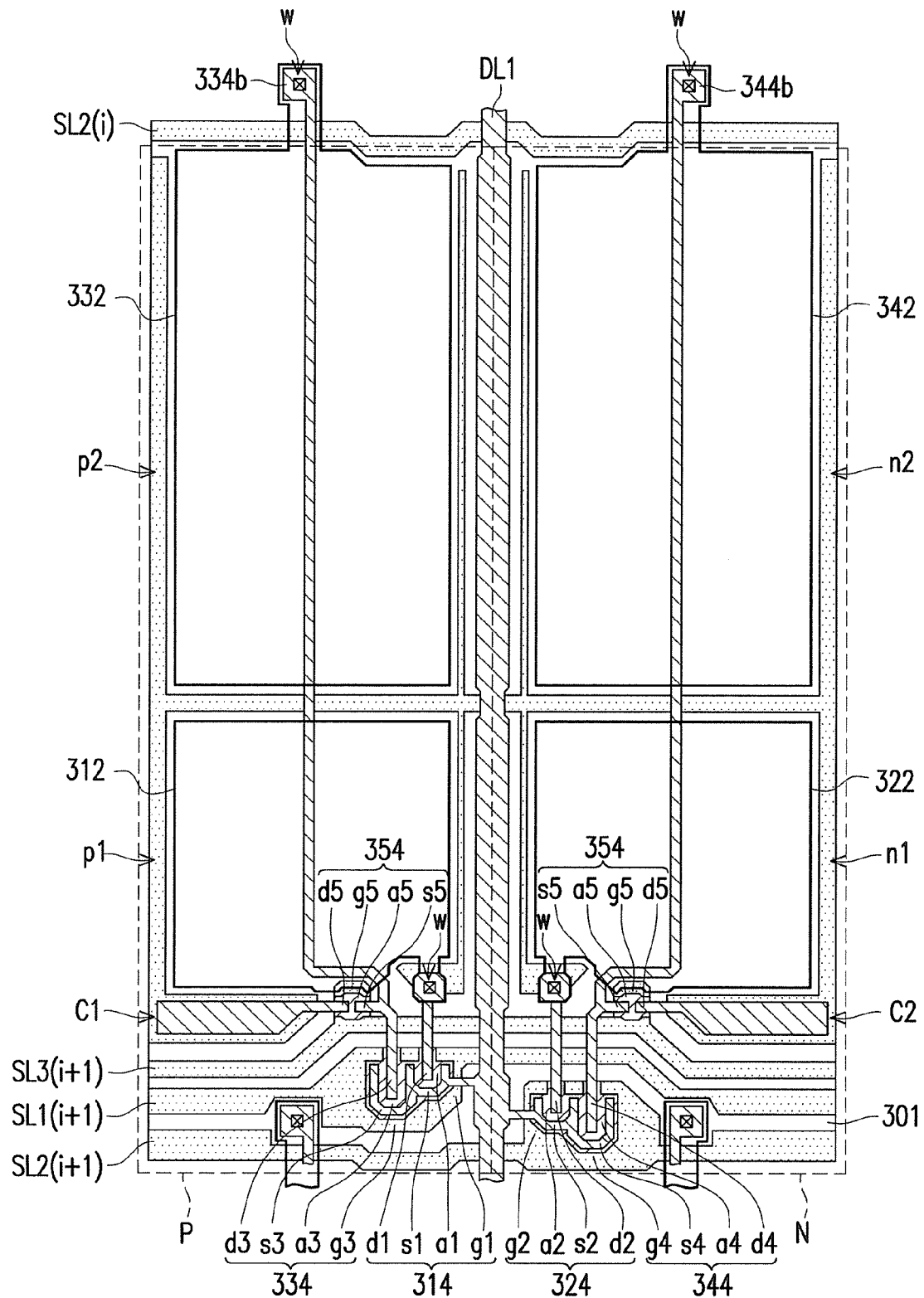
FIG. 8 is a partial top view of a pixel array according to the second embodiment.

The third drain d3 of the third active device 334 also can cross over one side of the third scan line SL3, the first pixel electrode 312 and the third pixel electrode 332, and extend to a region between a previous first scan line SL1 and a previous first second scan line SL2, and is electrically connected to the third pixel electrode 332 through a contact via w, wherein previous first scan line SL1 and a previous first second scan line SL2 are exist at previous pixel column, as shown in FIG. 8. By the same token, the fourth drain d4 of the fourth active device 344 also can, for example, cross over the first scan line SL1, the third scan line SL3, the second pixel electrode 322 and the fourth pixel electrode 342, and extend to a region between a previous first scan line SL1 and a previous second scan line SL2, and is electrically connected to the third pixel electrode 332 through a contact via w. As a result, an aperture ratio may further be increased.

Referring to FIG. 6 and FIG. 7 again. Specifically, the first active device 314 and the third active device 334 are electrically connected to the first scan line SL1 and driven by the first scan line SL1. The second active device 324 and the fourth active device 344 are electrically connected to the second scan line SL2 and driven by the second scan line SL2. The fifth active devices 354 are electrically connected to the third scan line SL3 and driven by the third scan line SL3. In addition, the first active device 314, the second active device 324, the third active device 334, the fourth active device 344 and the fifth active devices 354 share the first data line (the same data line) DL1 together. Therefore, amounts of source drivers may further be reduced.

Preferably, as shown in FIG. 6 and FIG. 7, a shared source (such as s1 and s3 together) of the first active device 314 and the third active device 334 is connected to one side of the first data line DL1. A shared source (such as s2 and s4 together) of the second active device 324 and the fourth active device 344 is connected to another side of the first data line DL1. The third pixel electrode 332 of a second sub-pixel p2 is connected to the source s5 of one of the fifth active devices 354, and the source s5 of the fifth active device 354 may connect to the drain d1 of the first active device 314 or the drain d3 of the third active device 334. That is, the source s5 of the fifth active device 354 is electrically connected to the first data line DL1 through the drain d1 of the first active device 314 or the drain d3 of the third active device 334. Preferably, the source s5 of one of the fifth active devices 354 is connected to the drain d3 of the third active device 334. In other words, a signal of the first data line DL1 received by the source s5 of the fifth active devices 354 may pass through the first active device 314 or the third active device 334.

In addition, a shared source of the second active device 324 and the fourth active device 344 is connected to another side of the first data line DL1. The fourth pixel electrode 342 of a fourth sub-pixel n2 is connected to the source s5 of one of the fifth active devices 354, and the source s5 of the fifth active device 354 may connect to the drain d2 of the second active device 324 or the drain d4 of the fourth active device 344. That is, the source s5 of the fifth active device 354 is electrically connected to the first data line DL1 through the drain d2 of the second active device 324 or the drain d4 of the fourth active device 344. Preferably, the source s5 of the another one of the fifth active devices 354 may connect to the drain d4 of the fourth active device 344. In other words, a signal of the first data line DL1 received by the source s5 of the fifth active devices 354 may pass through the second active device 324 or the fourth active device 344.

In view of the foregoing, one side of the first data line DL1 is opposite to another side of the first data line DL1. In other embodiments, in addition to a shared source of the first active device 314 and the third active device 334 or a shared source of the second active device 324 and the fourth active device 344, the first active device 314 and the third active device 334 may use individual sources, respectively, or the second active device 324 and the fourth active device 344 may use individual sources, respectively.

In addition, the pixel array 310b (marked in FIG. 7) of the present embodiment further includes a plurality of capacitors C1 and C2. One of the fifth active devices 354 is electrically connected to the capacitor C1, another one of the fifth active devices 354 is electrically connected to the capacitor C2. As shown in FIG. 6, an electrode of the capacitor C1 is connected to the drain d5 of the fifth active device 354 and another electrode of the capacitor C1 is constituted of a first wire layer, such as a common line, formed synchronically with a scan line. An electrode of the capacitor C2 is connected to the drain d5 of the fifth active device 354 and another electrode of the capacitor C2 is constituted of a first wire layer, such as a common line, formed synchronically with a scan line.

In FIG. 6, a plurality of extra capacitors may selectively be included, for example, at the same position of the capacitor C1, the first pixel electrode 312 partially covers the drain d5 of one of the fifth active devices 354. Thus, two electrodes of one of the extra capacitors are a portion of the first pixel electrode 312 and the drain d5 of one of the fifth active devices 354, respectively. Two electrodes of another one of the extra capacitors are constituted of a portion of the drain d3 of the third active device 334 and the first pixel electrode 312.

At the same position of the capacitor C2, the second pixel electrode 322 partially covers the drain d5 of another one of the fifth active devices 354. Thus, two electrodes of one of the extra capacitors are a portion of the second pixel electrode 322 and the drain d5 of another one of the fifth active devices 354, respectively. Two electrodes of another one of the extra capacitors are constituted of a portion of the drain d4 of the fourth active device 344 and the second pixel electrode 322.

Moreover, as shown in FIG. 8, an electrode of the capacitor C1 is connected to the drain d5 of the fifth active device 354 and another electrode of the capacitor C1 is constituted of a first wire layer, such as a common line, formed synchronically with a scan line. An electrode of the capacitor C2 is connected to the drain d5 of the fifth active device 354 and another electrode of the capacitor C2 is constituted of a first wire layer, such as a common line, formed synchronically with a scan line. In FIG. 8, at least extra capacitors may selectively be included, for example, two electrodes of the extra capacitors are constituted of a portion of the drain d3 of the third active device 334 and the first pixel electrode 312. Two electrodes of another one of the extra capacitors are constituted of a portion of the drain d4 of the fourth active device 344 and the second pixel electrode 322.

Specifically, after a scan signal is provided to the first scan line SL1 so as to turn on the third active device 334, a display data is written to the third pixel electrode 332 through the first data line DL1. In addition, the fifth active device 354 is turned on through the third scan line SL3, such that a driving voltage of the third pixel electrode 332 is further effected via the fifth active device 354 through the capacitor C1. As a result, the third pixel electrode 332 and the first pixel electrode 312 have different driving voltages so as to further display various colors of gray scales. By the same token, after a scan signal is provided to the first scan line SL1 so as to turn on the fourth active device 344, a display data is written to the fourth pixel electrode 342 through the first data line DL1. In addition, the fifth active device 354 is turned on through the third scan line SL3, such that a driving voltage of the fourth pixel electrode 342 is further effected via the fifth active device 354 through the capacitor C2. As a result, the fourth pixel electrode 342 and the second pixel electrode 322 have different driving voltages so as to further display various colors of gray scales and widen viewing angles for the display panel 1000.

In addition, if two scan lines disposed at different sides of the first pixel P is used to effect respectively driving voltages of the first pixel P and the second pixel N adjacent to each other, but the pixel array 310b of the present embodiment uses the same scan line (that is, the third scan line SL3) to effect driving voltages of the first pixel P and the second pixel N adjacent to each other. Wherein two scan lines disposed at different sides of the first pixel P means only one scan line disposed on one side of the first pixel P and only another scan line disposed on another side of the first pixel P, and the one side of the first pixel P is opposite to the another side of the first pixel P. As a result, the pixel array 310b of the present embodiment may use one less scan line. Therefore, an aperture ratio of pixels of the present embodiment may further be increased.

From another viewpoint, the first pixel P of the present embodiment, for example, is constituted of a first sub-pixel p1 and a second sub-pixel p2, wherein the first sub-pixel p1 includes the first pixel electrode 312 and the first active device 314, and the second sub-pixel p2 includes the third pixel electrode 332 and the third active device 334. In addition, the second pixel N of the present embodiment, for example, is constituted of a third sub-pixel n1 and a fourth sub-pixel n2, wherein the third sub-pixel n1 includes the second pixel electrode 322 and the second active device 324, and the second sub-pixel n2 includes the fourth pixel electrode 342 and the fourth active device 344.

The first sub-pixel p1 and the second sub-pixel p2 are both driven by the first scan line SL1, and the third sub-pixel n1 and the fourth sub-pixel n2 are both driven by the second scan line SL2. In the present embodiment, since the first scan line SL1 and the second scan line SL2 are both disposed at the same side of the first pixel electrode 312 and the second pixel electrode 322, opening directions of the first sub-pixel p1, the second sub-pixel p2, the third sub-pixel n1 and the fourth sub-pixel n2 all are the same. In addition, patterns of the first pixel electrode 312 and the third pixel electrode 332 of the first pixel P are substantially the same with patterns of the second pixel electrode 322 and the fourth pixel electrode 342 of the second pixel N, and the first pixel electrode 312 and the second pixel electrode 322 are both disposed at the same side of the third pixel electrode 332 and the fourth pixel electrode 342. In other words, the first pixel P and the second pixel N have substantially the same patterns.

In the present embodiment, the first sub-pixel p1 and the second sub-pixel p2 of the first pixel P may have different driving voltages so as to display various gray scale colors. By the same token, the third sub-pixel n1 and the fourth sub-pixel n2 of the second pixel P may have different driving voltages so as to display various gray scale colors. As a result, after an intermediate gray scale colors are mixed by higher gray scale colors and lower gray scale colors (that is, the concept of space overlapping or namely space superposition), viewers may watch images with similar color gray scales whenever watching displayed images of an liquid crystal display from normal angles or slanting angles.

Figure 9:
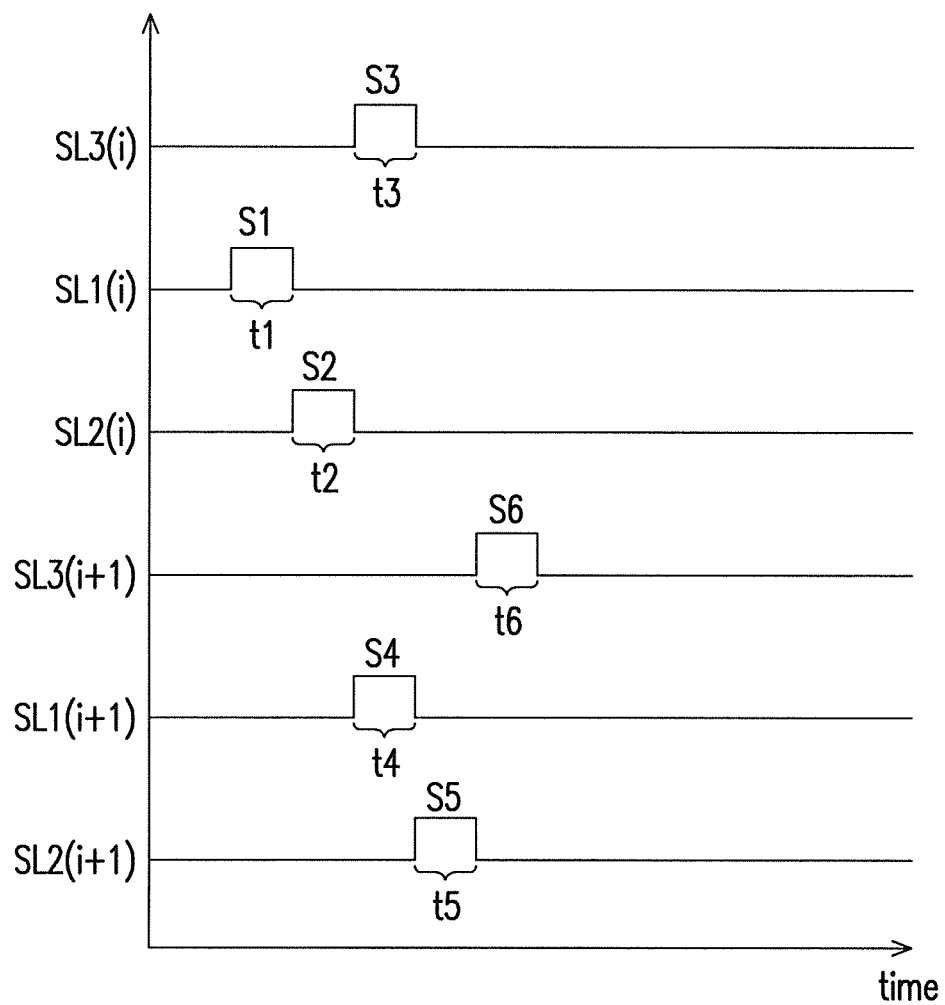
FIG. 9 is a timing waveform diagram of an equivalent circuit diagram of the pixel array of FIG. 7.

The following is an introduction of a driving method of driving the display panel 1000 having the pixel array 310b. FIG. 9 is a timing waveform diagram of an equivalent circuit diagram of the pixel array of FIG. 7. Referring to FIG. 7 and FIG. 9 together. The driving method includes the following steps. First, in a first period t1 within a frame period of the display panel 1000, a first scan signal S1 is provided to an $i^{th}$ first scan line SL1 so as to turn on the first active device 314 and the third active device 334 connected by the $i^{th}$ first scan line SL1. In the first period t1, a first display data is written to the first pixel electrode 312 and the third pixel electrode 332 via the first data line DL1, wherein the first pixel electrode 312 is connected by the first active device 314 connected by the $i^{th}$ first scan line SL1 and the third pixel electrode 332 is connected by the third active device 334 connected by the $i^{th}$ first scan line SL1, and i is an integer greater than or equal to 1.

Next, in a second period t2 within the frame period, a second scan signal S2 is provided to an $i^{th}$ second scan line SL2 so as to turn on the second active device 324 and the fourth active device 344 connected by the $i^{th}$ second scan line SL2. In the second period t2, a second display data is written to the second pixel electrode 322 and the fourth pixel electrode 342 via the first data line DL1, wherein the second pixel electrode 322 is connected by the second active device 324 connected by the $i^{th}$ second scan line SL2 and the fourth pixel electrode 342 is connected by the fourth active device 344 connected by the $i^{th}$ second scan line SL2.

Next, in a third period t3 within the frame period, a third scan signal S3 is provided to an $i^{th}$ third scan line SL3 so as to turn on fifth active devices 354 connected by the i$^{th}$ third scan line SL3, and affect the first display data written to the third pixel electrode 332 connected by the i$^{th}$ first scan line SL1 and the second display data written to the fourth pixel electrode 342 connected by the i$^{th}$ second scan line SL2. In addition, when corresponding to an equivalent circuit diagram as shown in FIG. 7, a region to which the signal is written is located at the first sub-pixel p1 and the second sub-pixel p2 (that is, the first pixel electrode 312 and the third pixel electrode 332) of the first pixel P and the third sub-pixel n1 and the fourth sub-pixel n2 (that is, the second pixel electrode 322 and the fourth pixel electrode 342) of the second pixel N on a first row.

Next, in a fourth period t4 within the frame period, a fourth scan signal S4 is provided to a (i+1)$^{th}$ first scan line SL1 so as to turn on the first active device 314 and the third active device 334 connected by the (i+1)$^{th}$ first scan line SL1. In the fourth period t4, a third display data is written to the first pixel electrode 312 and the third pixel electrode 332 via the first data line DL1, wherein the first pixel electrode 312 is connected by the first active device 314 connected by the (i+1)$^{th}$ first scan line SL1 and the third pixel electrode 332 is connected by the third active device 334 connected by the (i+1)$^{th}$ first scan line SL1.

Next, in a fifth period t5 within the frame period, a fifth scan signal S5 is provided to a (i+1)$^{th}$ second scan line SL2 so as to turn on the second active device 324 and the fourth active device 344 connected by the (i+1)$^{th}$ second scan line SL2. In the fifth period t5, a fourth display data is written to the second pixel electrode 322 and the fourth pixel electrode 342 via the first data line DL1, wherein the second pixel electrode 322 is connected by the second active device 324 connected by the (i+1)$^{th}$ second scan line SL2 and the fourth pixel electrode 342 is connected by the fourth active device 344 connected by the (i+1)$^{th}$ second scan line SL2.

Next, in a sixth period t6 within the frame period, a sixth scan signal S6 is provided to an (i+1)$^{th}$ third scan line SL3 so as to turn on fifth active devices 354 connected by the (i+1)$^{th}$ third scan line SL3, and affect the third display data written to the third pixel electrode 332 connected by the (i+1)$^{th}$ first scan line SL1 and the fourth display data written to the fourth pixel electrode 342 connected by the (i+1)$^{th}$ second scan line SL2. In addition, when corresponding to an equivalent circuit diagram as shown in FIG. 7, a region to which the signal is written is located at the first sub-pixel p1 and the second sub-pixel p2 (that is, the first pixel electrode 312 and the third pixel electrode 332) of the first pixel P and the third sub-pixel n1 and the fourth sub-pixel n2 (that is, the second pixel electrode 322 and the fourth pixel electrode 342) of the second pixel N on a second row, wherein, the first row is sequentially close to the second row.

Similar to the first embodiment, the driving method of the display panel 1000 of the present embodiment is to turn on the first scan line SL1 closer to the pixel P in the same row, and then turn on the second scan line SL2 farther from the pixel P in the same row. In addition, after the second scan line SL2 is turned on so as to write the second display data to the second pixel N, the second scan line SL2 is then turned off. When that happens, since the first scan line SL1 is turned off and does not have voltage changes, a capacitor coupling effect is not formed in an intersection of the second drain d2 and the first scan line SL1 that effect a data of the second pixel N. Accordingly, a feed-through voltage of the second pixel N is stabilized. In view of the foregoing, since feed-through voltages of the first pixel P and the second pixel N may maintain ideal values respectively, brightness of the first pixel P and the second pixel N may be the same so as to reduce bright and dark lines from occurring and further maintain favorable display quality for the display panel 1000.

Figure 10:
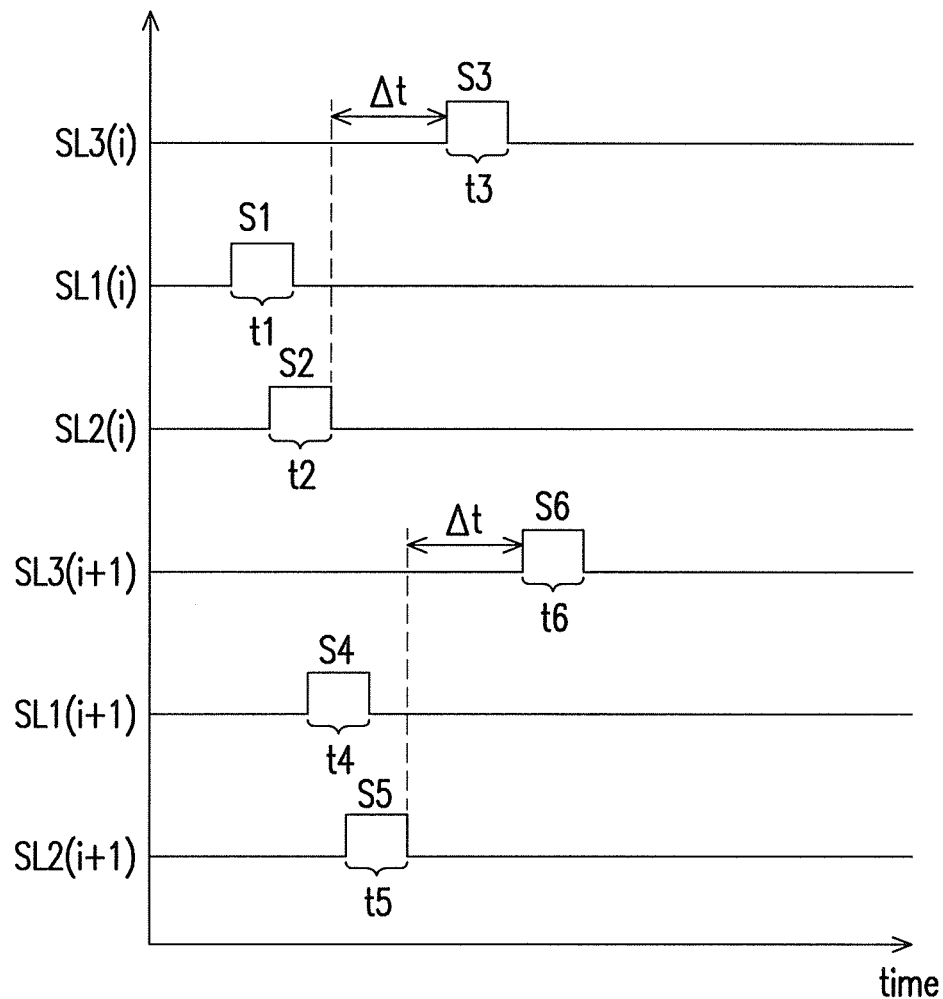
FIG. 10 is a timing waveform diagram of an equivalent circuit diagram of the pixel array of FIG. 7.

In the present embodiment, the second period t2 is initiated right after the first period t1, and the fifth period t5 is initiated right after the fourth period t4, as shown in FIG. 9. However, the invention is not limited thereof. In other embodiments, the second period t2 may also overlap partially with the first period t1, and the fifth period t5 may also overlap partially with the fourth period t4, as shown in FIG. 10.

In the present embodiment, the third period t3 is initiated right after the second period t2, and the sixty period t6 is initiated right after the fifth period t5. However, the invention is not limited thereof. In other embodiments, the third period t3 may also be initiated after the second period t2 is ended and a delay period Δt is elapsed, and the sixth period t6 may also be initiated after the fifth period t5 is ended and a delay period Δt is elapsed, as shown in FIG. 10. In other words, the invention may affect a driving voltage of the third pixel electrode 332 via the fifth active device 354 followed by the capacitor C1 right after the i$^{th}$ second scan line SL2 is turned off. However, the invention is not limited thereof. The invention may affect a driving voltage of the third pixel electrode 332 via the fifth active device 354 followed then through the capacitor C1 after the i$^{th}$ second scan line SL2 is turned off.

In the present embodiment, the third period t3 and the fourth period t4 are completely overlapped, as shown in FIG. 9. In other words, in the frame period, the third scan signal S3 and the fourth scan signal S4 are provided synchronically so as to synchronically turn on the i$^{th}$ third scan line SL3 and the (i+1)$^{th}$ first scan line SL1. Certainly, the invention is not limited thereof. In other embodiments, the third period t3 and the fourth period t4 may be also partially overlapped with each other or elapsed a period of time between each other, as shown in FIG. 10.

Figure 11:
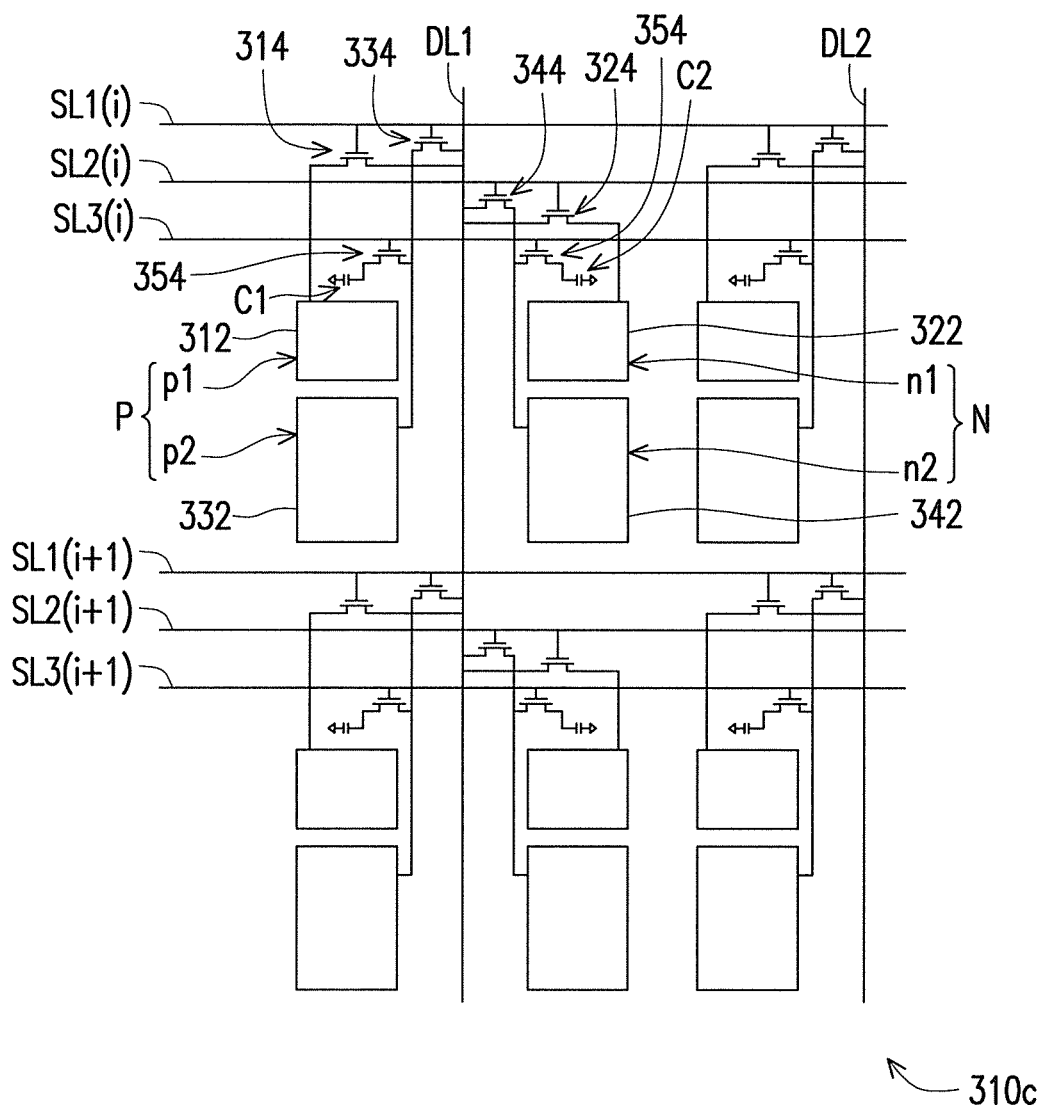
FIG. 11 is an equivalent circuit diagram of a pixel array according to the third embodiment.

FIG. 11 is an equivalent circuit diagram of a pixel array according to the third embodiment. Referring to FIG. 11. Specifically, structures of a pixel array 310c and the pixel array 310b (as shown in FIG. 7) are approximately identical, wherein a difference therebetween is: in the pixel array 310c of the third embodiment, the first drain d1 of the first active device 314 and the third drain d3 of the third active device 334 both interlace the second scan line SL2. In other words, in the present embodiment, the first drain d1 of the first active device 314 and the third drain d3 of the third active device 334 both interlace the second scan line SL2 and the third scan line SL3.

Figure 12:
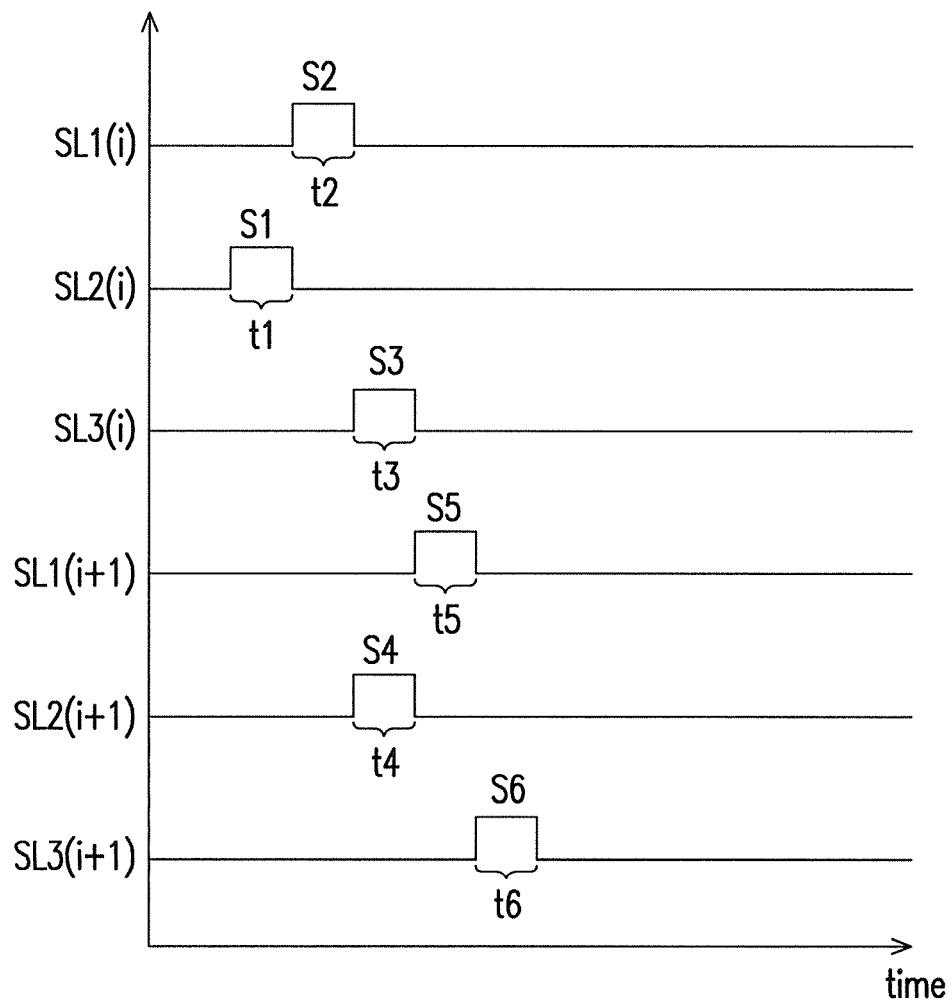
FIG. 12 is a timing waveform diagram of an equivalent circuit diagram of the pixel array of FIG. 11.

The following is an introduction of a driving method of driving the display panel 1000 having the pixel array 310c. FIG. 12 is a timing waveform diagram of an equivalent circuit diagram of the pixel array of FIG. 11. Referring to FIG. 11 and FIG. 12 together. The driving method includes the following steps. First, in a first period t1 within a frame period of the display panel 1000, a first scan signal S1 is provided to an i$^{th}$ second scan line SL2 so as to turn on the second active device 324 and the fourth active device 344 connected by the i$^{th}$ second scan line SL2. In the first period t1, a first display data is written to the second pixel electrode 322 and the fourth pixel electrode 342 via the first data line DL1, wherein the second pixel electrode 322 is connected by the second active device 324 connected by the i$^{th}$ second scan line SL2 and the fourth pixel electrode 342 is connected by the fourth active device 344 connected by the i$^{th}$ second scan line SL2, wherein i is an integer greater than or equal to 1.

Next, in a second period t2 within the frame period, a second scan signal S2 is provided to an i$^{th}$ first scan line SL1 so as to turn on the first active device 314 and the third active device 334 connected by the i$^{th}$ first scan line SL1, and a second display data is written to the first pixel electrode 312 and the third pixel electrode 332 via the first data line DL1, wherein the first pixel electrode 312 is connected by the first active device 314 connected by the i$^{th}$ first scan line SL1 and the third pixel electrode 332 is connected by the third active device 334 connected by the i$^{th}$ first scan line SL1.

Next, in a third period t3 within the frame period, a third scan signal S3 is provided to an i$^{th}$ third scan line SL3 so as to turn on fifth active devices 354 connected by the i$^{th}$ third scan line SL3, and affect the second display data written to the third pixel electrode 332 connected by the i$^{th}$ first scan line SL1 and the first display data written to the fourth pixel electrode 342 connected by the i$^{th}$ second scan line SL2. In addition, when corresponding to an equivalent circuit diagram as shown in FIG. 11, a region to which the signal is written is located at the first sub-pixel p1 and the second sub-pixel p2 (that is, the first pixel electrode 312 and the third pixel electrode 332) of the first pixel P and the third sub-pixel n1 and the fourth sub-pixel n2 (that is, the second pixel electrode 322 and the fourth pixel electrode 342) of the second pixel N on a first row.

Next, in a fourth period t4 within the frame period, a fourth scan signal S4 is provided to a (i+1)$^{th}$ second scan line SL2 so as to turn on the second active device 324 and the fourth active device 344 connected by the (i+1)$^{th}$ second scan line SL2. In the fourth period t4, a third display data is written to the second pixel electrode 322 and the fourth pixel electrode 342 via the first data line DL1, wherein the second pixel electrode 322 is connected by the second active device 324 connected by the (i+1)$^{th}$ second scan line SL2 and the fourth pixel electrode 342 is connected by the fourth active device 344 connected by the (i+1)$^{th}$ second scan line SL2.

Next, in a fifth period t5 within the frame period, a fifth scan signal S5 is provided to a (i+1)$^{th}$ first scan line SL1 so as to turn on the first active device 314 and the third active device 334 connected by the (i+1)$^{th}$ first scan line SL1. In the fifth period t5, a fourth display data is written to the first pixel electrode 312 and the third pixel electrode 332 connected by the (i+1)$^{th}$ first scan line SL1 via the first data line DL1, wherein the first pixel electrode 312 is connected by the first active device 314 connected by the (i+1)$^{th}$ first scan line SL1 and the third pixel electrode 332 is connected by the third active device 334 connected by the (i+1)$^{th}$ first scan line SL1.

Next, in a sixth period t6 within the frame period, a sixth scan signal S6 is provided to a (i+1)$^{th}$ third scan line SL3 so as to turn on fifth active devices 354 connected by the (i+1)$^{th}$ third scan line SL3, and affect the fourth display data written to the third pixel electrode 332 connected by the (i+1)$^{th}$ first scan line SL1 and the third display data written to the fourth pixel electrode 342 connected by the (i+1)$^{th}$ second scan line SL2. In addition, when corresponding to an equivalent circuit diagram as shown in FIG. 11, a region to which the signal is written is located at the first sub-pixel p1 and the second sub-pixel p2 (that is, the first pixel electrode 312 and the third pixel electrode 332) of the first pixel P and the third sub-pixel n1 and the fourth sub-pixel n2 (that is, the second pixel electrode 322 and the fourth pixel electrode 342) of the second pixel N on a second row, wherein, the first row is sequentially close to the second row.

Figure 13:
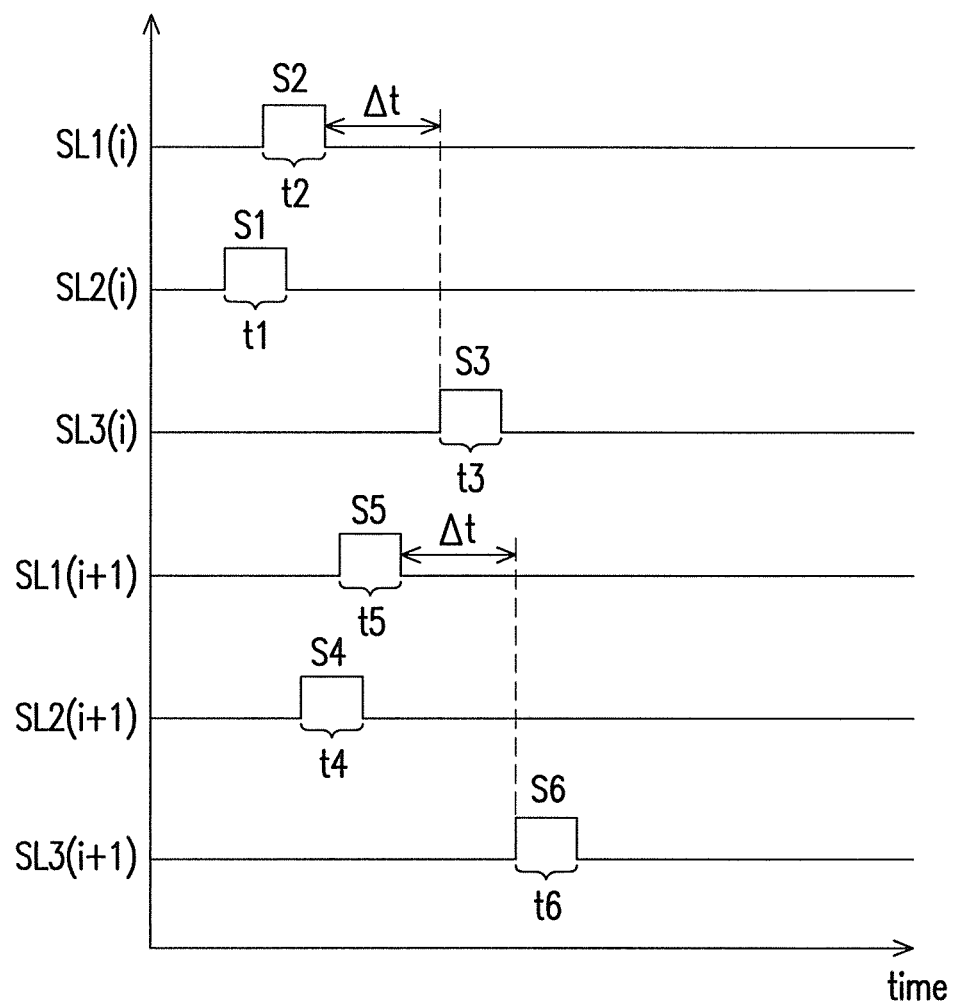
FIG. 13 is a timing waveform diagram of an equivalent circuit diagram of the pixel array of FIG. 11.

In other embodiments, a driving method of driving the display panel 1000 having the pixel array 310c may be illustrated in FIG. 13. Specifically, in the embodiment illustrated in FIG. 13, the second period t2 may be overlapped partially with the first period t1, and the fifth period t5 may be overlapped partially with the fourth period t4. In addition, the third period t3 may be initiated after the second period t2 is ended and a delay period Δt is elapsed, and the sixth period t6 may be initiated after the fifth period t5 is ended and a delay period Δt is elapsed. In addition, the invention does not limit that the third period t3 and the fourth period t4 may be completely overlapped with each other, partially overlapped with each other, or be elapsed a period of time between each other.

Figure 14:
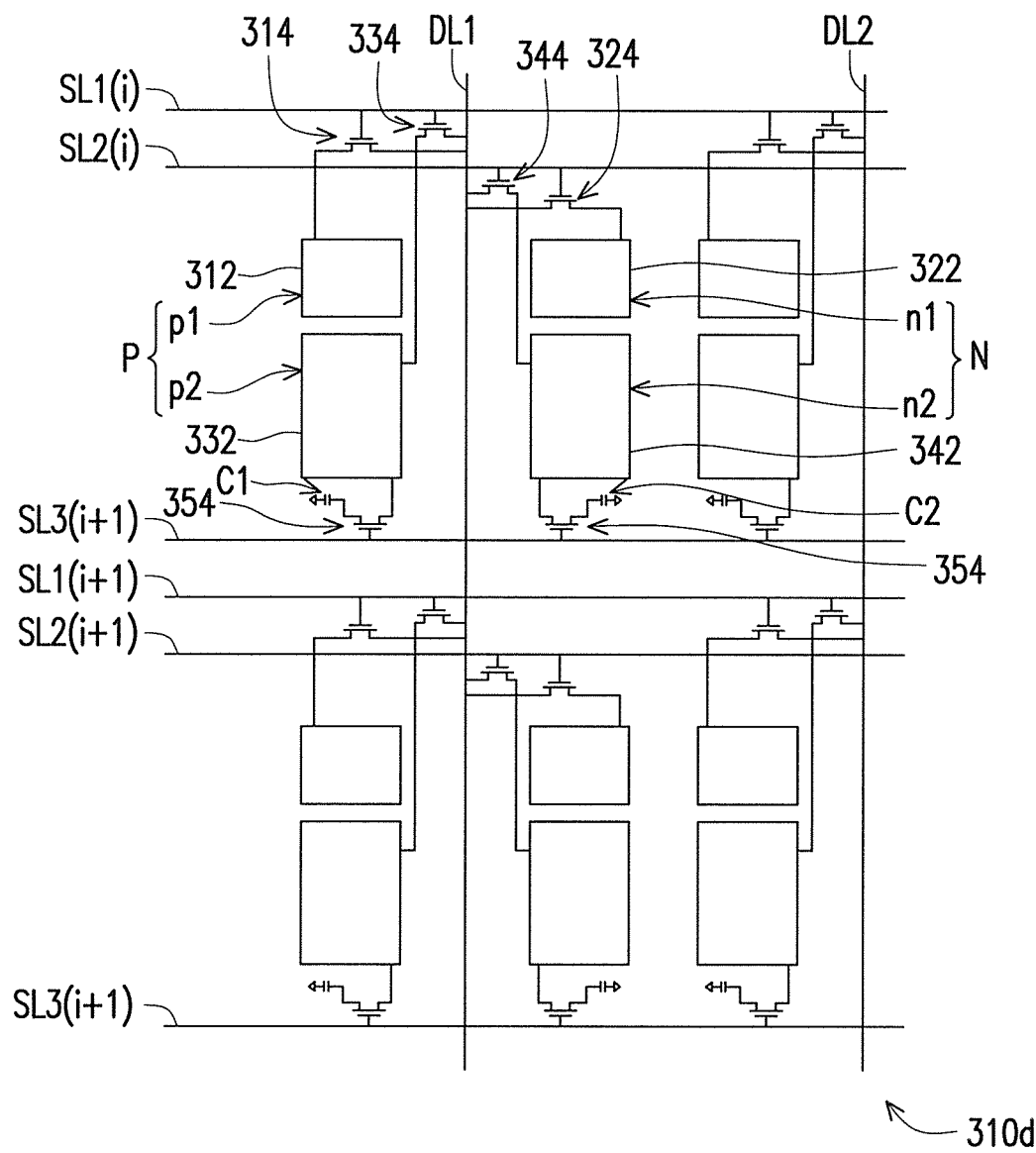
FIG. 14 is an equivalent circuit diagram of a pixel array according to the fourth embodiment.

FIG. 14 is an equivalent circuit diagram of a pixel array according to the fourth embodiment. Referring to FIG. 14. Structures of a pixel array 310d of the fourth embodiment and the pixel array 310c of the third embodiment are approximately identical, wherein a difference therebetween is: in the pixel array 310d of the fourth embodiment, the first active device 314 and the third active device 334 are disposed on one side of the first scan line SL1 which is not the side of the third scan line SL3, that is, a different side, and both the drain d1 of the first active device 314 and the drain d3 of the third active device 334 interlace the second scan line SL2. However, neither the drain d1 of the first active device 314 nor the drain d3 of the third active device 334 interlace the third scan line SL3. The second active device 324 and the fourth active device 344 are disposed on one side of the first scan line SL1 which is not the side of the third scan line SL3, that is, a different side, and both the drain d2 of the second active device 324 and the drain d4 of the fourth active device 344 interlace the second scan line SL2. However, neither the drain d2 of the second active device 324 nor the drain d4 of the fourth active device 344 interlace the third scan line SL3. In other words, the first pixel P is used to facilitate explanations. Both the first scan line SL1 and the second scan line SL2 are disposed at one side of the first pixel P. The third scan line SL3 is disposed at another side of the pixel P, that is, the one side of the first pixel P is different from (that is, opposite to) another side of the first pixel P.

Figure 15:
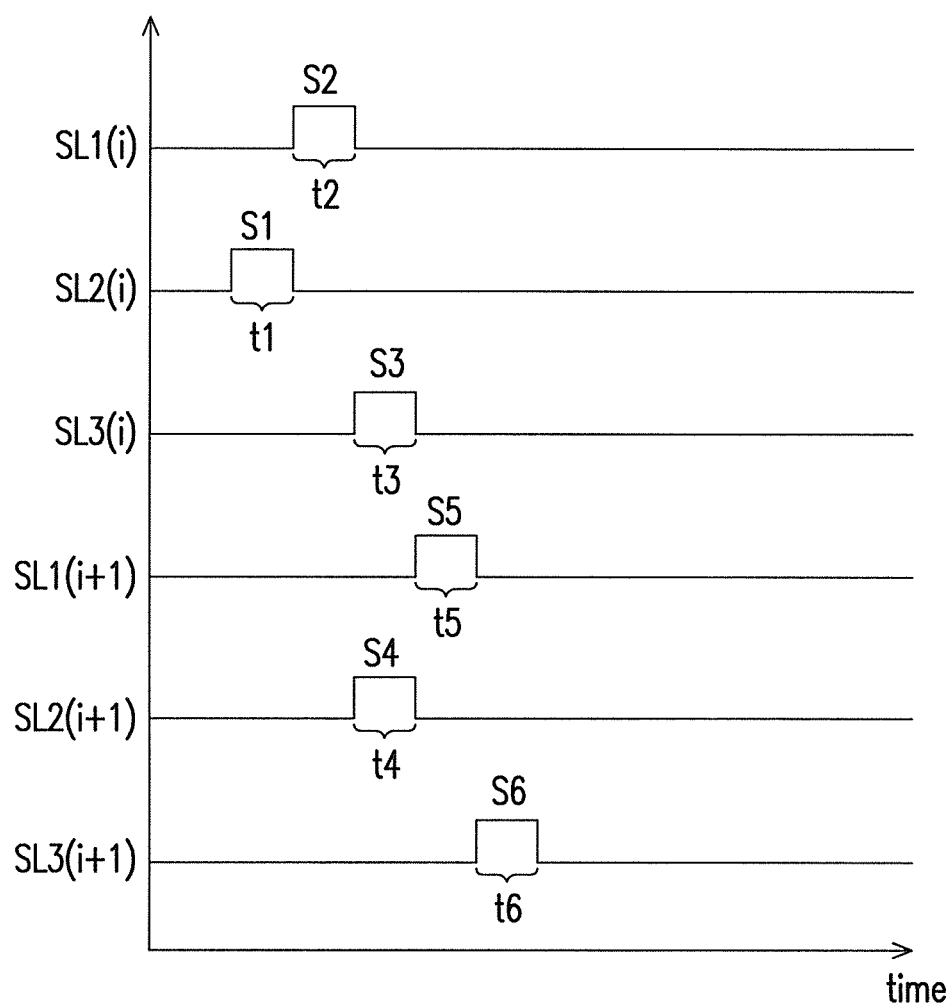
FIG. 15 is a timing waveform diagram of an equivalent circuit diagram of the pixel array of FIG. 14.

The following is an introduction of a driving method of driving the display panel 1000 having a pixel array 310d. FIG. 15 is a timing waveform diagram of an equivalent circuit diagram of the pixel array of FIG. 14. Referring to FIG. 14 and FIG. 15 together. The driving method includes the following steps. First, in a first period t1 within a frame period of the display panel 1000, a first scan signal S1 is provided to an i$^{th}$ second scan line SL2 so as to turn on the second active device 324 and the fourth active device 344 connected by the i$^{th}$ second scan line SL2. In the first period t1, a first display data is written to the second pixel electrode 322 and the fourth pixel electrode 342 connected by the i$^{th}$ second scan line SL2 via the first data line DL1, wherein the second pixel electrode 322 is connected by the second active device 324 connected by the i$^{th}$ second scan line SL2 and the fourth pixel electrode 342 is connected by the fourth active device 344 connected by the i$^{th}$ second scan line SL2, wherein i is an integer greater than or equal to 1.

Next, in a second period t2 within the frame period, a second scan signal S2 is provided to an i$^{th}$ first scan line SL1 so as to turn on the first active device 314 and the third active device 334 connected by the i$^{th}$ first scan line SL1. In the second period t2, a second display data is written to the first pixel electrode 312 and the third pixel electrode 332 via the first data line DL1, wherein the first pixel electrode 312 is connected by the first active device 314 connected by the i$^{th}$ first scan line SL1 and the third pixel electrode 332 is connected by the third active device 334 connected by the i$^{th}$ first scan line SL1.

Next, in a third period t3 within the frame period, a third scan signal S3 is provided to an i$^{th}$ third scan line SL3 so as to turn on fifth active devices 354 connected by the i$^{th}$ third scan line SL3, and affect the second display data written to the third pixel electrode 332 connected by the i$^{th}$ first scan line SL1 and the first display data written to the fourth pixel electrode 342 connected by the i$^{th}$ second scan line SL2. In addition, when corresponding to an equivalent circuit diagram as shown in FIG. 14, a region to which the signal is written is located at the first sub-pixel p1 and the second sub-pixel p2 (that is, the first pixel electrode 312 and the third pixel electrode 332) of the first pixel P and the third sub-pixel n1 and the fourth sub-pixel n2 (that is, the second pixel electrode 322 and the fourth pixel electrode 342) of the second pixel N on a first row.

Next, in a fourth period t4 within the frame period, a fourth scan signal S4 is provided to a (i+1)$^{th}$ second scan line SL2 so as to turn on the second active device 324 and the fourth active device 344 connected by the (i+1)$^{th}$ second scan line SL2. In the fourth period t4, a third display data is written to the second pixel electrode 322 and the fourth pixel electrode 342 via the first data line DL1, wherein the second pixel electrode 322 is connected by the second active device 324 connected by the (i+1)$^{th}$ second scan line SL2 and the fourth pixel electrode 342 is connected by the fourth active device 344 connected by the (i+1)$^{th}$ second scan line SL2.

Next, in a fifth period t5 within the frame period, a fifth scan signal S5 is provided to a (i+1)$^{th}$ first scan line SL1 so as to turn on the first active device 314 and the third active device 334 connected by the (i+1)$^{th}$ first scan line SL1. In the fifth period t5, a fourth display data is written to the first pixel electrode 312 and the third pixel electrode 332 via the first data line DL1, wherein the first pixel electrode 312 is connected by the first active device 314 connected by the (i+1)$^{th}$ first scan line SL1 and the third pixel electrode 332 is connected by the third active device 334 connected by the (i+1)$^{th}$ first scan line SL1.

Next, in a sixth period t6 within the frame period, a sixth scan signal S6 is provided to a (i+1)$^{th}$ third scan line SL3 so as to turn on the fifth active devices 354 connected by the (i+1)$^{th}$ third scan line SL3, and affect the fourth display data written to the third pixel electrode 332 connected by the (i+1)$^{th}$ first scan line SL1 and the third display data written to the fourth pixel electrode 342 connected by the (i+1)$^{th}$ second scan line SL2. In addition, when corresponding to an equivalent circuit diagram as shown in FIG. 14, a region to which the signal is written is located at the first sub-pixel p1 and the second sub-pixel p2 (that is, the first pixel electrode 312 and the third pixel electrode 332) of the first pixel P and the third sub-pixel n1 and the fourth sub-pixel n2 (that is, the second pixel electrode 322 and the fourth pixel electrode 342) of the second pixel N on a second row, wherein the first row is sequentially close to the second row.

Figure 16:
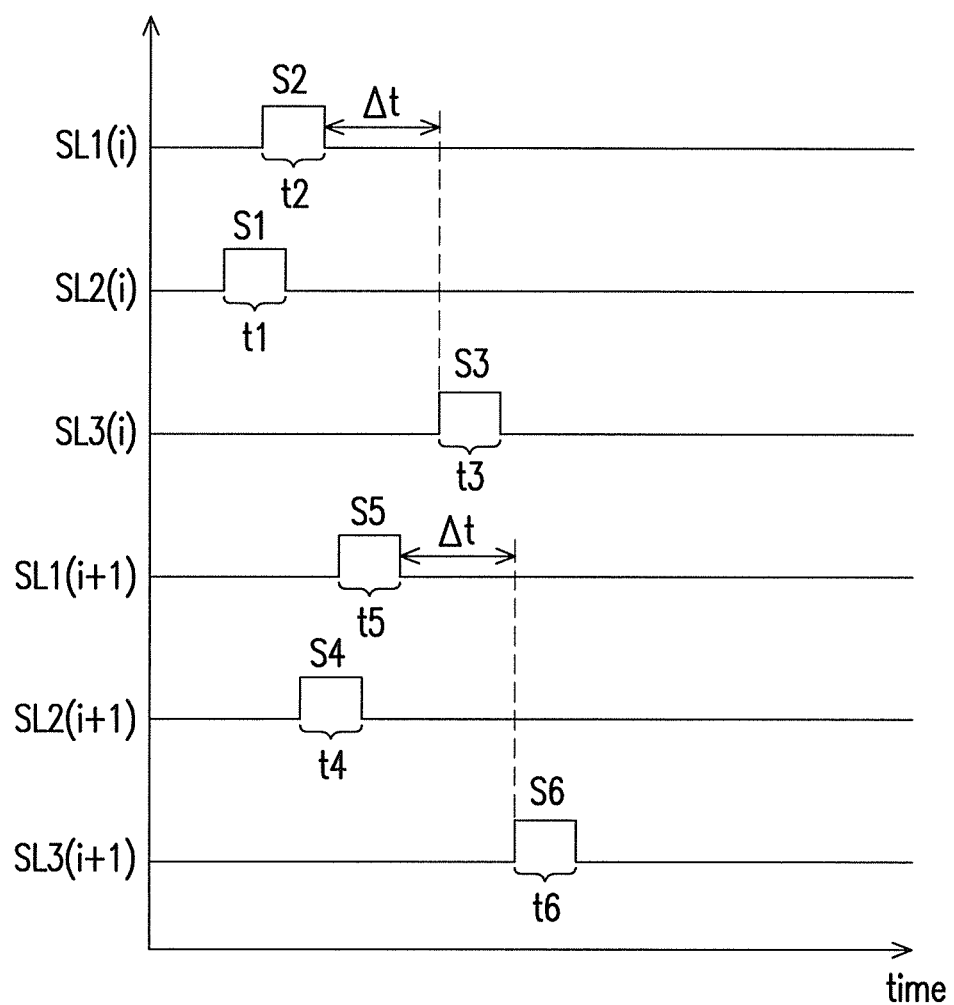
FIG. 16 is a timing waveform diagram of an equivalent circuit diagram of the pixel array of FIG. 14.

In other embodiments, a driving method of driving the display panel 1000 having the pixel array 310d may also be illustrated in FIG. 16. Specifically, in the embodiment illustrated in FIG. 16, the second period t2 may be overlapped partially with the first period t1, and the fifth period t5 may be overlapped partially with the fourth period t4. In addition, the third period t3 may be initiated after the second period t2 is ended and a delay period Δt is elapsed, and the sixth period t6 may be initiated after the fifth period t5 is ended and a delay period Δt is elapsed. In addition, the invention does not limit that the third period t3 and the fourth period t4 may be completely overlapped with each other, partially overlapped with each other, or be elapsed a period of time between each other.

Figure 17:
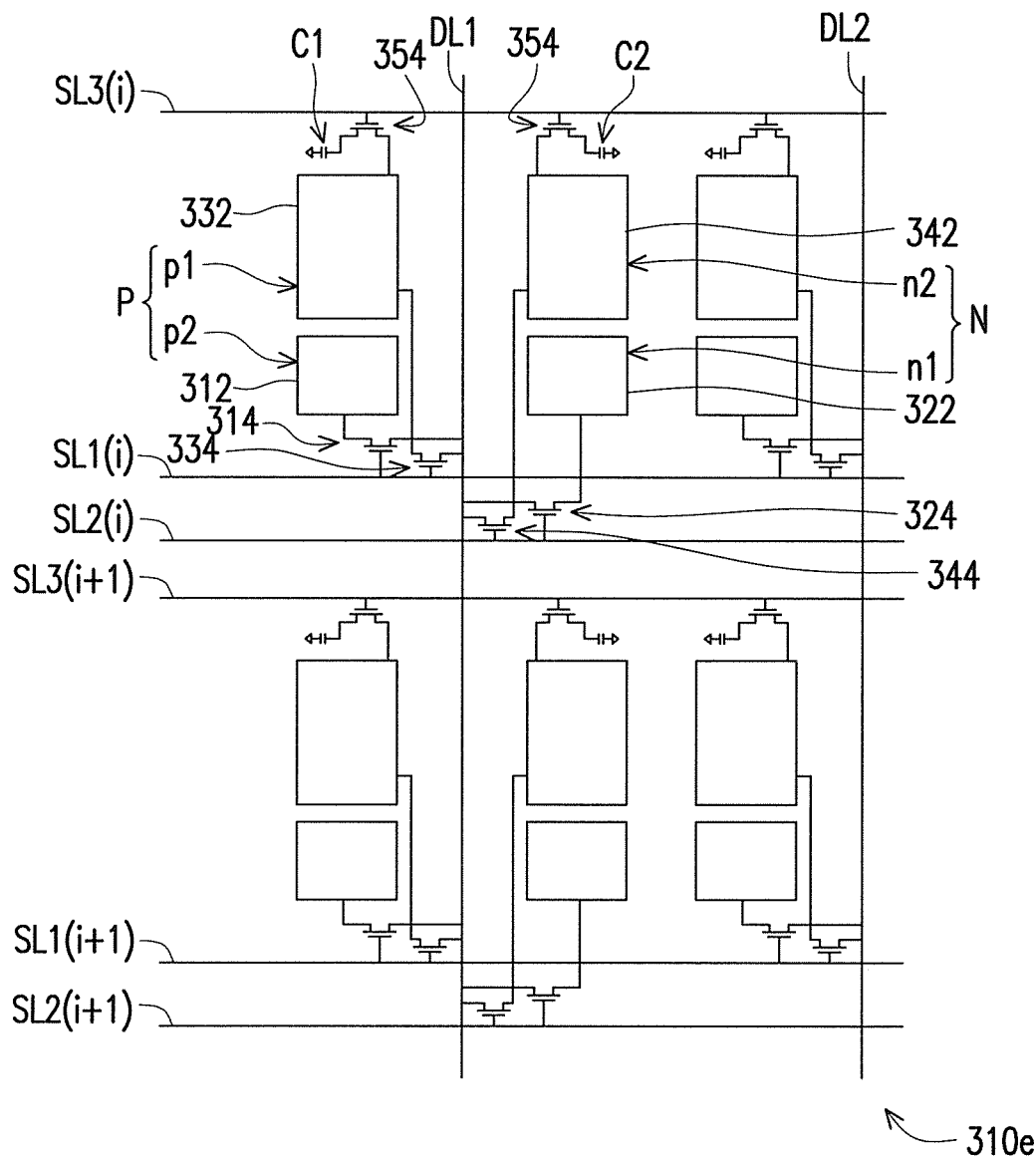
FIG. 17 is an equivalent circuit diagram of a pixel array according to the fifth embodiment.

FIG. 17 is an equivalent circuit diagram of a pixel array according to the fifth embodiment. Referring to FIG. 17. Structures of a pixel array 310e of the fifth embodiment and the pixel array 310b of the second embodiment are approximately identical, wherein a difference therebetween is: in the pixel array 310e of the fifth embodiment, the first active device 314 is disposed on one side of the first scan line SL1 which is not the side of the third scan line SL3, that is, a different side, and neither the drain d1 of the first active device 314 nor the drain d3 of the third active device 334 interlace the first scan line SL1, the second scan line SL2 and the third scan line SL3. However, both the second drain d2 of the second active device 324 and the fourth drain d4 of the fourth active device 344 interlace the first scan line SL1, and neither the second drain d2 of the second active device 324 nor the fourth drain d4 of the fourth active device 344 interlace the third scan line SL3. In other words, the first pixel P is used to facilitate explanations. Both the first scan line SL1 and the second scan line SL2 are disposed at one side of the first pixel P. The third scan line SL3 is disposed at another side of the first pixel P, that is, one side of the first pixel P is different from (that is, opposite to) another side of the first pixel P.

Figure 18:
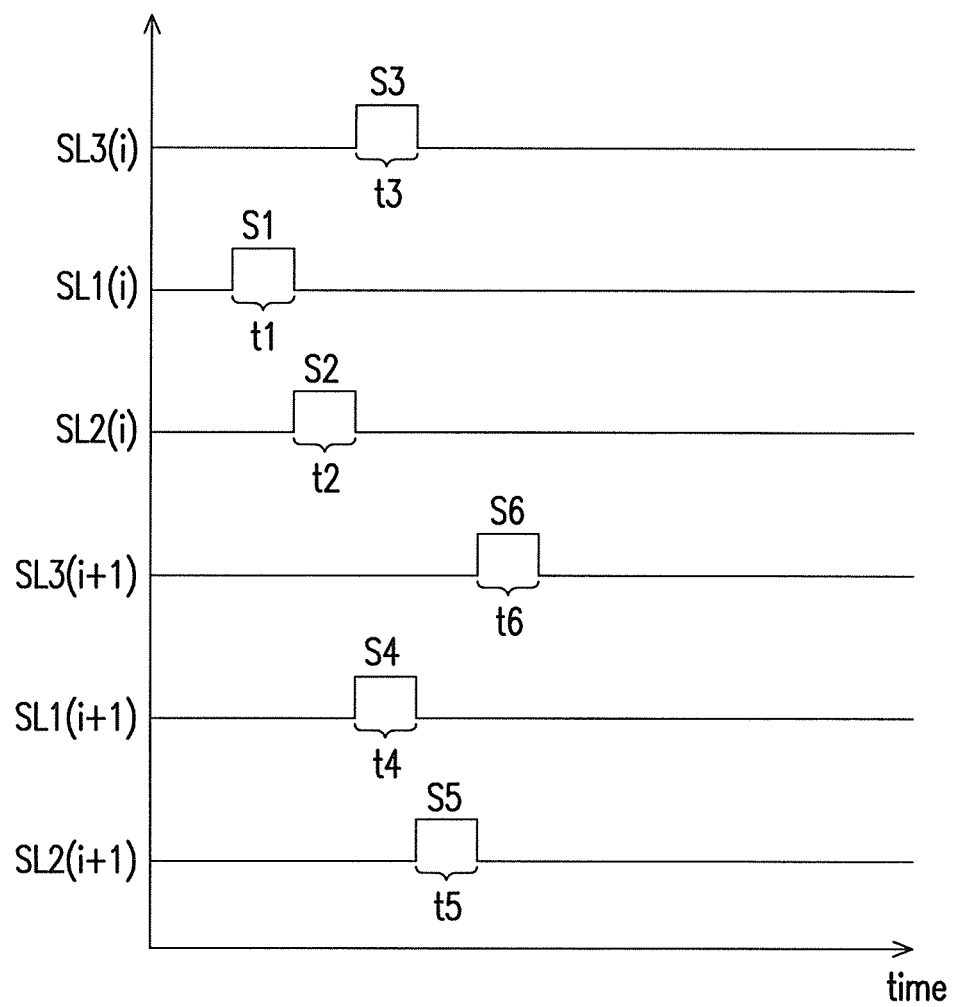
FIG. 18 is a timing waveform diagram of an equivalent circuit diagram of the pixel array of FIG. 17.

The following is an introduction of a driving method of driving the display panel 1000 having the pixel array 310e. FIG. 18 is a timing waveform diagram of an equivalent circuit diagram of the pixel array of FIG. 17. Referring to FIG. 17 and FIG. 18 together. The driving method includes the following steps. First, in a first period t1 within a frame period of the display panel 1000, a first scan signal S1 is provided to an i$^{th}$ first scan line SL1 so as to turn on the first active device 314 and the third active device 334 connected by the i$^{th}$ first scan line SL1. In the first period t1, a first display data is written to the first pixel electrode 312 and the third pixel electrode 332 via the first data line DL1, wherein the first pixel electrode 312 is connected by the first active device 314 connected by the i$^{th}$ first scan line SL1 and the third pixel electrode 332 is connected by the third active device 334 connected by the i$^{th}$ first scan line SL1, and i is an integer greater than or equal to 1.

Next, in a second period t2 within the frame period, the second scan signal S2 is provided to an i$^{th}$ second scan line SL2 so as to turn on the second active device 324 and the fourth active device 344 connected by the i$^{th}$ second scan line SL2. In the second period t2, a second display data is written to the second pixel electrode 322 and the fourth pixel electrode 342 via the first data line DL1, wherein the second pixel electrode 322 is connected by the second active device 324 connected by the i$^{th}$ second scan line SL2 and the fourth pixel electrode 342 is connected by the fourth active device 344 connected by the i$^{th}$ second scan line SL2.

Next, in a third period t3 within the frame period, a third scan signal S3 is provided to an i$^{th}$ third scan line SL3 so as to turn on the fifth active devices 354 connected by the i$^{th}$ third scan line SL3, and affect the first display data written to the third pixel electrode 332 connected by the i$^{th}$ first scan line SL1 and the second display data written to the fourth pixel electrode 342 connected by the i$^{th}$ second scan line SL2. In addition, when corresponding to an equivalent circuit diagram as shown in FIG. 17, a region to which the signal is written is located at the first sub-pixel p1 and the second sub-pixel p2 (that is, the first pixel electrode 312 and the third pixel electrode 332) of the first pixel P and the third sub-pixel n1 and the fourth sub-pixel n2 (that is, the second pixel electrode 322 and the fourth pixel electrode 342) of the second pixel N on a first row.

Next, in a fourth period t4 within the frame period, a fourth scan signal S4 is provided to an (i+1)$^{th}$ first scan line SL1 so as to turn on the first active device 314 and the third active device 334 connected by the (i+1)$^{th}$ first scan line SL1. In the fourth period t4, a third display data is written to the first pixel electrode 312 and the third pixel electrode 332 via the first data line DL1, wherein the first pixel electrode 312 is connected by the first active device 314 connected by the (i+1)$^{th}$ first scan line SL1 and the third pixel electrode is connected by the third active device 334 connected by the (i+1)$^{th}$ first scan line SL1.

Next, in a fifth period t5 within the frame period, a fifth scan signal S5 is provided to an (i+1)$^{th}$ second scan line SL2 so as to turn on the second active device 324 and the fourth active device 344 connected by the (i+1)$^{th}$ second scan line SL2. In the fifth period t5, a fourth display data is written to the second pixel electrode 322 and the fourth pixel electrode 342 connected by the (i+1)$^{th}$ second scan line SL2 via the first data line DL1, wherein the second pixel electrode 322 is connected by the second active device 324 connected by the (i+1)$^{th}$ second scan line SL2 and the fourth pixel electrode 342 is connected by the fourth active device 344 connected by the (i+1)$^{th}$ second scan line SL2.

Next, in a sixth period t6 within the frame period, a sixth scan signal S6 is provided to an (i+1)$^{th}$ third scan line SL3 so as to turn on the fifth active devices 354 connected by the (i+1)$^{th}$ third scan line SL3, and affect the third display data written to the third pixel electrode 332 connected by the (i+1)$^{th}$ first scan line SL1 and the fourth display data written to the fourth pixel electrode 342 connected by the (i+1)$^{th}$ second scan line SL2. In addition, when corresponding to an equivalent circuit diagram as shown in FIG. 14, a region to which the signal is written is located at the first sub-pixel p1 and the second sub-pixel p2 (that is, the first pixel electrode 312 and the third pixel electrode 332) of the first pixel P and the third sub-pixel n1 and the fourth sub-pixel n2 (that is, the second pixel electrode 322 and the fourth pixel electrode 342) in the second pixel N on a second row, wherein the first row is sequentially close to the second row.

Figure 19:
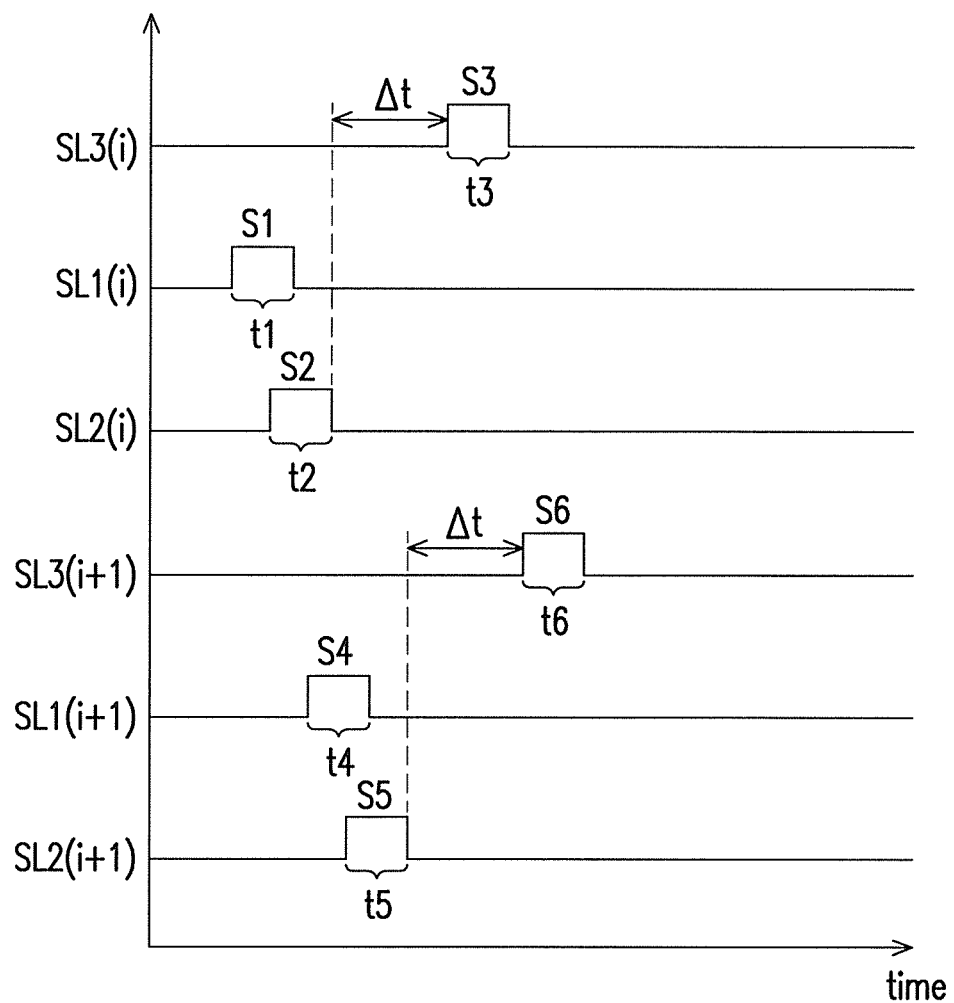
FIG. 19 is a timing waveform diagram of an equivalent circuit diagram of the pixel array of FIG. 17.

In other embodiments, a driving method of driving the display panel 1000 having the pixel array 310e may also be illustrated in FIG. 19. Specifically, in the embodiment illustrated in FIG. 19, the second period t2 may be overlapped partially with the first period t1, and the fifth period t5 may be overlapped partially with the fourth period t4. In addition, the third period t3 may be initiated after the second period t2 is ended and a delay period Δt is elapsed, and the sixth period t6 may be initiated after the fifth period t5 is ended and a delay period Δt is elapsed. In addition, the invention does not limit that the third period t3 and the fourth period t4 may be completely overlapped with each other, partially overlapped with each other, or is elapsed a period of time between each other.

Generally, if the display panel having pixel arrays in a charge structure of the embodiment is applied to a stereoscopic display panel, since the switchable barrier 2000 covers portions of pixels of the display panel 1000 and exposes another portions of pixels, issues of color shifts and bright and dark lines can occur if main-pixels and sub-pixels in the exposed adjacent pixels have display regions in different ratios.

Figure 20:
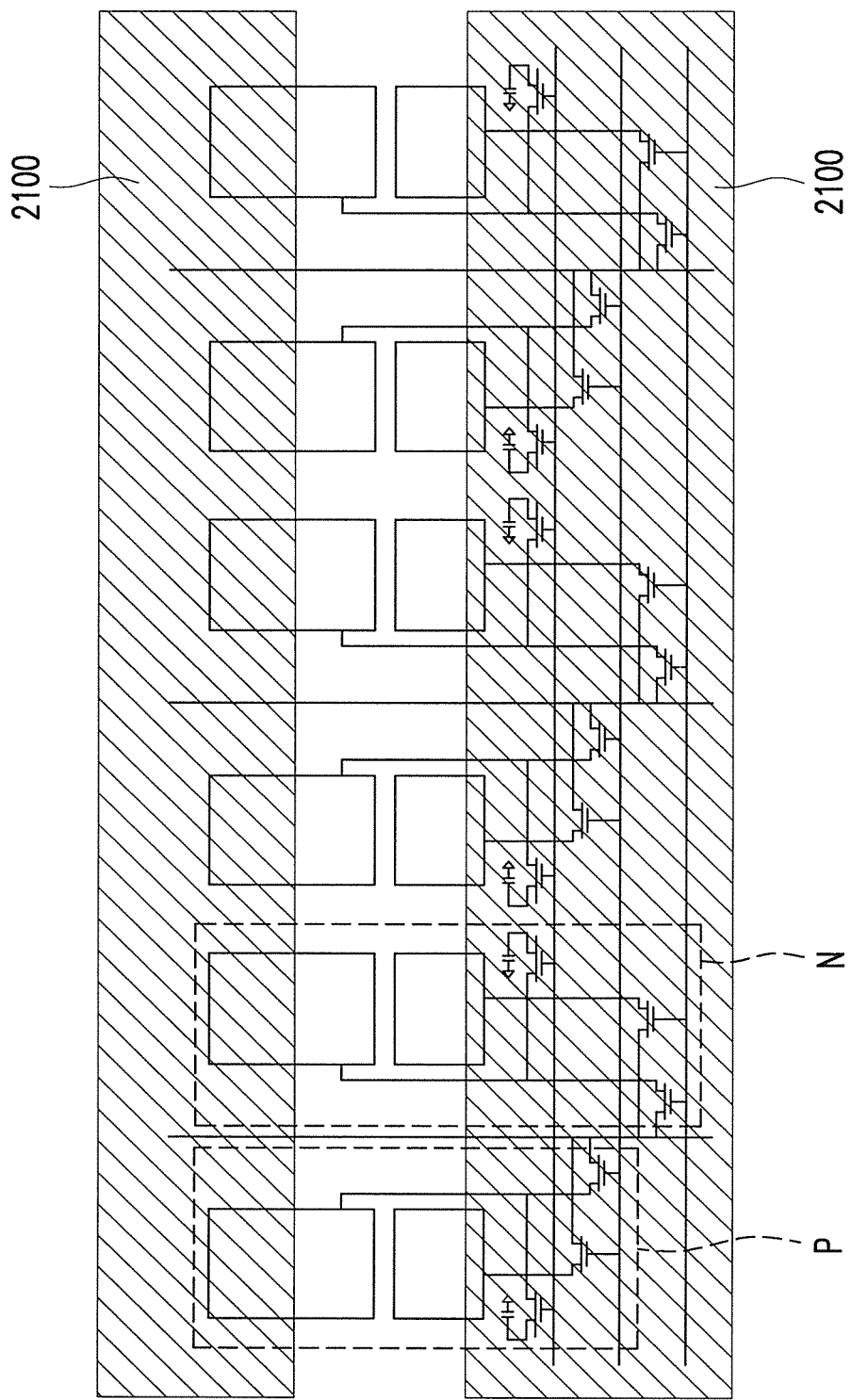
FIG. 20 is a schematic top view of a pixel array and a switchable panel according to the second embodiment.

In light of the foregoing, in the pixel arrays 310a to 310e of the embodiments, since patterns of the first pixel P and the second pixel N are substantially the same, the display panel 1000 having the pixel arrays 310a to 310e is suitable for applying to the stereoscopic display panel D. FIG. 20 is a schematic top view of a pixel array and a switchable panel according to the second embodiment. Referring to FIG. 20. For example, a passive barrier in the switchable panel 2000 is considered a better example by using a black shading layer (or namely light shading layer) 2100 to cover a portion of the pixel array 310b and expose another portion of the pixel array 310b. In other embodiments, an active barrier may also be used. It should be noted that, in FIG. 20, only the black shading layer 2100 and the pixel array 310b are illustrated and taken as an example so as to clearly describe relative positions of the aforementioned. Specifically, since the patterns of the first pixel P and the second pixel N are substantially the same, the first pixel P and the second pixel N exposed by the black shading layer 2100 have display regions of substantially the same ratios. In other words, the black shading layer 2100 covers a portion of the first sub-pixel p1 and the second sub-pixel p2 of the first pixel P and exposes another portion of the first sub-pixel p1 and the second sub-pixel p2 of the first pixel P. Meanwhile, the black shading layer 2100 covers a portion of the third sub-pixel n1 and the fourth sub-pixel n2 of the second pixel N and exposes another portion of the third sub-pixel n1 and the fourth sub-pixel n2 of the second pixel N. In addition, if the pixel array 310a is taken as an example, the black shading layer 2100 covers a portion of the first pixel electrode 312 and the second pixel electrode 322 and exposes another portion of the first pixel electrode 312 and the second pixel electrode 322. As a result, the stereoscopic display panel D not only has an advantage of wide viewing angles but also contains display frames having uniformed brightness. Herewith, the pixel array 310b is taken as an example for descriptions. However, the invention is not limited thereof. In other embodiments, designs adopting the pixel arrays 310c to 310e may also achieve the same effects.

In addition, the at least one active device in the embodiments, for example, a transistor type of the first, the second, the third, the fourth and the fifth active devices, may include a bottom-gate type, a top-gate type or other types, and a semiconductor material of active devices may include an amorphous silicon semiconductor material, a poly-Si semiconductor material, a single crystal silicon semiconductor material, a micro-crystalline silicon semiconductor material, a nano crystal semiconductor material, an oxide semiconductor material, an organic semiconductor material, other suitable semiconductor material or a combination of the aforementioned.

In addition, in FIG. 2, the first scan line SL1 and the second scan line SL2 adjacent closely, preferably the first scan line SL1 is closest to the first pixel electrode 312 and the second pixel electrode 322, and the second scan line SL2 is farther away from the first pixel electrode 312 and the second pixel electrode 322. In other words, the first scan line SL1 is disposed between the first pixel electrode 312 and the second scan line SL2 and is disposed between the second pixel electrode 322 and the second scan line SL2. In other embodiments, the first scan line SL1 and the second scan line SL2 adjacent closely, preferably the second scan line SL2 is closest to the first pixel electrode 312 and the second pixel electrode 322, and the first scan line SL1 is farther away from the first pixel electrode 312 and the second pixel electrode 322. In other words, the second scan line SL2 is disposed among the first scan line SL1, the first pixel electrode 312 and the second pixel electrode 322 (the second scan line SL2 is disposed between the first pixel electrode 312 and the first scan line SL1 and is disposed between the second pixel electrode 322 and the first scan line SL1).

In FIG. 6 and FIG. 8, the first scan line SL1, the second scan line SL2 and the third scan line SL3 adjacent closely among each other, preferably the third scan line SL3 is closest to the first pixel electrode 312 and the second pixel electrode 322, and FIG. 2 is an example of a preferable arrangement of the second scan line SL2 and the first scan line SL1, that is, the first scan line SL1 is close secondary to the first pixel electrode 312 and the second pixel electrode 322. The second scan line SL2 is farthest away from the first pixel electrode 312 and the second pixel electrode 322. In other words, the third scan line SL3 is disposed among the first scan line SL1, the first pixel electrode 312 and the second pixel electrode 322 (the third scan line SL3 is disposed between the first pixel electrode 312 and the first scan line SL1 and is disposed between the second pixel electrode 322 and the first scan line SL1). The first scan line SL1 is disposed between the third scan line SL3 and the second scan line SL2. In other embodiments, the second scan line SL2 is disposed between the third scan line SL3 and the first scan line SL1, that is, the first scan line SL1 is farthest away from the first pixel electrode 312 and the second pixel electrode 322.

In light of the foregoing, in the display panel of the invention, the first scan line and the second scan line are disposed at the same side of the first active device and the second active device, such that the first active device and the second active device have the same aperture direction. Accordingly, when a photomask shift occurs in a photomask fabricating process for patterns of the defined source and the drain, a variable quantity of gate/source capacitors in adjacent sub-pixel is the same and has the same feed through voltages. As a result, adjacent sub-pixels has the same brightness and the display panel has favorable display quality.

Although the invention has been disclosed by the above embodiments, they are not intended to limit the invention. It will be apparent to those of ordinary skill in the art that modifications and variations to the invention may be made without departing from the spirit and the scope of the invention. Accordingly, the protection scope of the invention falls in the appended claims.

What is claimed is:

1. A display panel, comprising:
an opposite substrate;
a display medium; and
a pixel array substrate, wherein the display medium is disposed between the opposite substrate and the pixel array substrate, the pixel array substrate comprises a pixel array disposed on a substrate, the pixel array at least comprises a first scan line, a second scan line, a third scan line, a first data line, a first pixel electrode, a second pixel electrode, a third pixel electrode, a fourth pixel electrode, a first active device, a second active device, a third active device, a fourth active device and a plurality of fifth active devices, the first data line is electrically connected to the first pixel electrode disposed at left side of the first data line through the first active device and electrically connected to the third pixel electrode disposed at the left side of the first data line through the third active device, the first data line is also electrically connected to the second pixel electrode at right side of the first data line through the second active device and electrically connected to the fourth pixel electrode disposed at the right side of the first data line through the fourth active device, the first scan line is electrically connected to the first active device and the third active device, the second scan line is electrically connected to the second active device and fourth active device, the third scan line is electrically connected to the third pixel electrode and the fourth pixel electrode disposed at the same side of the third scan line through the fifth active devices, and the first scan line and the second scan line are disposed at the same side of the first active, the second active device, the third active device and the fifth active device.

2. The display panel of claim 1, wherein a drain of the first active device and a drain of the second active device cross over the same side of a gate of the first active device and a gate of the second active device.

3. The display panel of claim 1, wherein the first scan line, the second scan line and the third scan line are disposed at the same side of the first pixel electrode.

4. The display panel of claim 1, wherein the first active device is disposed at a different side of the first scan line and the third scan line.

5. The display panel of claim 1, wherein the pixel array further comprises a plurality of capacitors, each of the fifth active devices is electrically connected between the corresponding capacitor and the third pixel electrode, or is electrically connected between the corresponding capacitor and the fourth pixel electrode.

6. The display panel of claim 1, wherein the first pixel electrode and the second pixel electrode are disposed at the same side of the third pixel electrode and the fourth pixel electrode.

7. The display panel of claim 1, wherein the display medium include a liquid crystal material.

8. The display panel of claim 1, wherein the opposite substrate is a color filter substrate.

9. A stereoscopic display panel for a viewer to watch, comprising:
a switchable barrier; and
the display panel of claim 1, wherein the switchable barrier and the display panel all are located on an observation path of the viewer.

10. A driving method adapted to drive the display panel of claim 3, wherein the first scan line, the second scan line and the third scan line are disposed at the same side of the first pixel electrode, a drain of the second active device and a drain of the fourth active device interlace the first scan line, and the driving method comprises:
in a first period within a frame period of the display panel, providing a first scan signal to an $i^{th}$ first scan line so as to turn on the first active device and the third active device connected by the $i^{th}$ first scan line, and writing a first display data to the first pixel electrode and the third pixel electrode via the first data line, wherein the first pixel electrode is connected by the first active device connected by the $i^{th}$ first scan line and the third pixel electrode is connected by the third active device connected by the $i^{th}$ first scan line, and i is an integer greater than or equal to 1;
in a second period within the frame period, providing a second scan signal to an $i^{th}$ second scan line so as to turn on the second active device and the fourth active device connected by the $i^{th}$ second scan line, and writing a second display data to the second pixel electrode and the fourth pixel electrode via the first data line, wherein the second pixel electrode is connected by the second active device connected by the $i^{th}$ second scan line and the fourth pixel electrode is connected by the fourth active device connected by the $i^{th}$ second scan line;
in a third period within the frame period, providing a third scan signal to an $i^{th}$ third scan line so as to turn on the fifth active devices connected by the $i^{th}$ third scan line, and affect the first display data written to the third pixel electrode connected by the $i^{th}$ first scan line and the second display data written to the fourth pixel electrode connected by the $i^{th}$ second scan line;
in a fourth period within the frame period, providing a fourth scan signal to a $(i+1)^{th}$ first scan line so as to turn on the first active device and the third active device connected by the $(i+1)^{th}$ first scan line, and writing a third display data to the first pixel electrode and the third pixel electrode via the first data line, wherein the first pixel electrode is connected by the first active device connected by the (i+1)$^{th}$ first scan line and the third pixel electrode is connected by the third active device connected by the (i+1)$^{th}$ first scan line;

in a fifth period within the frame period, providing a fifth scan signal to a (i+1)$^{th}$ second scan line so as to turn on the second active device and the fourth active device connected by the (i+1)$^{th}$ second scan line, and writing a fourth display data to the second pixel electrode and the fourth pixel electrode via the first data line, wherein the second pixel electrode is connected by the second active device connected by the (i+1)$^{th}$ second scan line and the fourth pixel electrode is connected by the fourth active device connected by the (i+1)$^{th}$ second scan line; and in a sixth period within the frame period, providing a sixth scan signal to a (i+1)$^{th}$ third scan line so as to turn on the fifth active devices connected by the (i+1)$^{th}$ third scan line, and affect the third display data written to the third pixel electrode connected by the (i+1)$^{th}$ first scan line and the fourth display data written to the fourth pixel electrode connected by the (i+1)$^{th}$ second scan line.

11. The driving method of claim 10, wherein the second period follows right after the first period.

12. The driving method of claim 10, wherein the second period overlaps partially with the first period.

13. The driving method of claim 10, wherein the fifth period follows right after the fourth period.

14. The driving method of claim 10, wherein the fifth period overlaps partially with the fourth period.

15. The driving method of claim 10, wherein the third period follows right after the second period.

16. The driving method of claim 10, wherein the third period is initiated after the second period is ended and a delay period is elapsed.

17. The driving method of claim 10, wherein the sixth period follows right after the fifth period.

18. The driving method of claim 10, wherein the sixth period is initiated after the fifth period is ended and a delay period is elapsed.

19. The driving method of claim 10, wherein the third period overlaps completely with the fourth period.

20. A driving method adapted to drive the display panel of claim 3, wherein the first scan line, the second scan line and the third scan line are disposed at the same side of the first pixel electrode, a drain of the first active device and a drain of the third active device interlace the second scan line, and the driving method comprises:

in a first period within a frame period of the display panel, providing a first scan signal to an i$^{th}$ second scan line so as to turn on the second active device and the fourth active device connected by the i$^{th}$ second scan line, and writing a first display data to the second pixel electrode and the fourth pixel electrode via the first data line, wherein the second pixel electrode is connected by the second active device connected by the i$^{th}$ second scan line and the fourth pixel electrode is connected by the fourth active device connected by the i$^{th}$ second scan line, and i is an integer greater than or equal to 1;

in a second period within the frame period, providing a second scan signal to an i$^{th}$ first scan line so as to turn on the first active device and the third active device connected by the i$^{th}$ first scan line, and writing a second display data to the first pixel electrode and the third pixel electrode via the first data line, wherein the first pixel electrode is connected by the first active device connected by the i$^{th}$ first scan line and the third pixel electrode is connected by the third active device connected by the i$^{th}$ first scan line;

in a third period within the frame period, providing a third scan signal to an i$^{th}$ third scan line so as to turn on the fifth active devices connected by the i$^{th}$ third scan line, and affect the second display data written to the third pixel electrode connected by the i$^{th}$ first scan line and the first display data written to the fourth pixel electrode connected by the i$^{th}$ second scan line;

in a fourth period within the frame period, providing a fourth scan signal to a (i+1)$^{th}$ second scan line so as to turn on the second active device and the fourth active device connected by the (i+1)$^{th}$ second scan line, and writing a third display data to the second pixel electrode and the fourth pixel electrode via the first data line, wherein the second pixel electrode is connected by the second active device connected by the (i+1)$^{th}$ second scan line and the fourth pixel electrode is connected by the fourth active device connected by the (i+1)$^{th}$ second scan line;

in a fifth period within the frame period, providing a fifth scan signal to a (i+1)$^{th}$ first scan line so as to turn on the first active device and the third active device connected by the (i+1)$^{th}$ first scan line, and writing a fourth display data to the first pixel electrode and the third pixel electrode via the first data line, wherein the first pixel electrode is connected by the first active device connected by the (i+1)$^{th}$ first scan line and the third pixel electrode is connected by the third active device connected by the (i+1)$^{th}$ first scan line; and in a sixth period within the frame period, providing a sixth scan signal to a (i+1)$^{th}$ third scan line so as to turn on the fifth active devices connected by the (i+i)$^{th}$ third scan line, and affect the fourth display data written to the third pixel electrode connected by the (i+1)$^{th}$ first scan line and the third display data written to the fourth pixel electrode connected by the (i+1)$^{th}$ second scan line.

21. The driving method of claim 20, wherein the second period follows right after the first period.

22. The driving method of claim 20, wherein the second period overlaps partially with the first period.

23. The driving method of claim 20, wherein the fifth period follows right after the fourth period.

24. The driving method of claim 20, wherein the fifth period overlaps partially with the fourth period.

25. The driving method of claim 20, wherein the third period follows right after the second period.

26. The driving method of claim 20, wherein the third period is initiated after the second period is ended and a delay period is elapsed.

27. The driving method of claim 20, wherein the sixth period follows right after the fifth period.

28. The driving method of claim 20, wherein the sixth period is initiated after the fifth period is ended and a delay period is elapsed.

29. The driving method of claim 20, wherein the third period overlaps completely with the fourth period.

30. A driving method adapted to drive the display panel of claim 4, wherein the first active device is disposed at the different side of the first scan line and the third scan line, a drain of the first active device and a drain of the third active device interlace the second scan line, and the driving method comprises:

in a first period within a frame period of the display panel, providing a first scan signal to an i$^{th}$ second scan line so as to turn on the second active device and the fourth active device connected by the i$^{th}$ second scan line, and writing a first display data to the second pixel electrode and the fourth pixel electrode via the first data line, wherein the second pixel electrode is connected by the second active device connected by the $i^{th}$ second scan line and the fourth pixel electrode is connected by the fourth active device connected by the $i^{th}$ second scan line, and i is an integer greater than or equal to 1;

in a second period within the frame period, providing a second scan signal to an $i^{th}$ first scan line so as to turn on the first active device and the third active device connected by the $i^{th}$ first scan line, and writing a second display data to the first pixel electrode and the third pixel electrode via the first data line, wherein the first pixel electrode is connected by the first active device connected by the $i^{th}$ first scan line and the third pixel electrode is connected by the third active device connected by the $i^{th}$ first scan line;

in a third period within the frame period, providing a third scan signal to an $i^{th}$ third scan line so as to turn on the fifth active devices connected by the $i^{th}$ third scan line, and affect the second display data written to the third pixel electrode connected by the $i^{th}$ first scan line and the first display data written to the fourth pixel electrode connected by the $i^{th}$ second scan line;

in a fourth period within the frame period, providing a fourth scan signal to a $(i+1)^{th}$ second scan line so as to turn on the second active device and the fourth active device connected by the $(i+1)^{th}$ second scan line, and writing a third display data to the second pixel electrode and the fourth pixel electrode via the first data line, wherein the second pixel electrode is connected by the second active device connected by the $(i+1)^{th}$ second scan line and the fourth pixel electrode is connected by the fourth active device connected by the $(i+1)^{th}$ second scan line;

in a fifth period within the frame period, providing a fifth scan signal to a $(i+1)^{th}$ first scan line so as to turn on the first active device and the third active device connected by the $(i+1)^{th}$ first scan line, and writing a fourth display data to the first pixel electrode and the third pixel electrode via the first data line, wherein the first pixel electrode is connected by the first active device connected by the $(i+1)^{th}$ first scan line and the third pixel electrode is connected by the third active device connected by the $(i+1)^{th}$ first scan line; and in a sixth period within the frame period, providing a sixth scan signal to a $(i+1)^{th}$ third scan line so as to turn on the fifth active devices connected by the $(i+1)^{th}$ third scan line, and affect the fourth display data written to the third pixel electrode connected by the $(i+1)^{th}$ first scan line and the third display data written to the fourth pixel electrode connected by the $(i+1)^{th}$ second scan line.

31. The driving method of claim 30, wherein the second period follows right after the first period.

32. The driving method of claim 30, wherein the second period overlaps partially with the first period.

33. The driving method of claim 30, wherein the fifth period follows right after the fourth period.

34. The driving method of claim 30, wherein the fifth period overlaps partially with the fourth period.

35. The driving method of claim 30, wherein the third period follows right after the second period.

36. The driving method of claim 30, wherein the third period is initiated after the second period is ended and a delay period is elapsed.

37. The driving method of claim 30, wherein the sixth period follows right after the fifth period.

38. The driving method of claim 30, wherein the sixth period is initiated after the fifth period is ended and a delay period is elapsed.

39. The driving method of claim 30, wherein the third period overlaps completely with the fourth period.

40. A driving method adapted to drive the display panel of claim 4, wherein the first active device is disposed at the different side of the first scan line and the third scan line, a drain of the second active device and a drain of the fourth active device interlace the first scan line, and the driving method comprises:

in a first period within a frame period of the display panel, providing a first scan signal to an $i^{th}$ first scan line so as to turn on the first active device and the third active device connected by the $i^{th}$ first scan line, and writing a first display data to the first pixel electrode and the third pixel electrode via the first data line, wherein the first pixel electrode is connected by the first active device connected by the $i^{th}$ first scan line and the third pixel electrode is connected by the third active device connected by the $i^{th}$ first scan line, and i is an integer greater than or equal to 1;

in a second period within the frame period, providing a second scan signal to an $i^{th}$ second scan line so as to turn on the second active device and the fourth active device connected by the $i^{th}$ second scan line, and writing a second display data to the second pixel electrode and the fourth pixel electrode via the first data line, wherein the second pixel electrode is connected by the second active device connected by the $i^{th}$ second scan line and the fourth pixel electrode is connected by the fourth active device connected by the $i^{th}$ second scan line;

in a third period within the frame period, providing a third scan signal to an $i^{th}$ third scan line so as to turn on the fifth active devices connected by the $i^{th}$ third scan line, and affect the first display data written to the third pixel electrode connected by the $i^{th}$ first scan line and the second display data written to the fourth pixel electrode connected by the $i^{th}$ second scan line;

in a fourth period within the frame period, providing a fourth scan signal to a $(i+1)^{th}$ first scan line so as to turn on the first active device and the third active device connected by the $(i+1)^{th}$ first scan line, and writing a third display data to the first pixel electrode and the third pixel electrode via the first data line, wherein the first pixel electrode is connected by the first active device connected by the $(i+1)^{th}$ first scan line and the third pixel electrode is connected by the third active device connected by the $(i+1)^{th}$ first scan line;

in a fifth period within the frame period, providing a fifth scan signal to a $(i+1)^{th}$ second scan line so as to turn on the second active device and the fourth active device connected by the $(i+1)^{th}$ second scan line, and writing a fourth display data to the second pixel electrode and the fourth pixel electrode via the first data line, wherein the second pixel electrode is connected by the second active device connected by the $(i+1)^{th}$ second scan line and the fourth pixel electrode is connected by the fourth active device connected by the $(i+1)^{th}$ second scan line; and in a sixth period within the frame period, providing a sixth scan signal to a $(i+1)^{th}$ third scan line so as to turn on the fifth active devices connected by the $(i+1)^{th}$ third scan line, and affect the third display data written to the third pixel electrode connected by the $(i+1)^{th}$ first scan line and the fourth display data written to the fourth pixel electrode connected by the $(i+1)^{th}$ second scan line.

41. The driving method of claim 40, wherein the second period follows right after the first period.

42. The driving method of claim 40, wherein the second period overlaps partially with the first period.

43. The driving method of claim 40, wherein the fifth period follows right after the fourth period.

44. The driving method of claim 40, wherein the fifth period overlaps partially with the fourth period.

45. The driving method of claim 40, wherein the third period follows right after the second period.

46. The driving method of claim 40, wherein the third period is initiated after the second period is ended and a delay period is elapsed.

47. The driving method of claim 40, wherein the sixth period follows right after the fifth period.

48. The driving method of claim 40, wherein the sixth period is initiated after the fifth period is ended and a delay period is elapsed.

49. The driving method of claim 40, wherein the third period overlaps completely with the fourth period.

\* \* \* \* \*